(12) United States Patent
Hasegawa et al.

(10) Patent No.: US 7,906,249 B2
(45) Date of Patent: Mar. 15, 2011

(54) FUEL TANK FOR FUEL CELL AND FUEL CELL SYSTEM

(75) Inventors: Kenji Hasegawa, Osaka (JP); Masaru Odagiri, Osaka (JP); Masaru Higashionji, Osaka (JP); Masafumi Shimotashiro, Osaka (JP)

(73) Assignee: Panasonic Corporation, Osaka (JP)

(*) Notice: Subject to any disclaimer, the term of this patent is extended or adjusted under 35 U.S.C. 154(b) by 1011 days.

(21) Appl. No.: 10/590,277

(22) PCT Filed: Feb. 24, 2005

(86) PCT No.: PCT/JP2005/003019
§ 371 (c)(1),
(2), (4) Date: Aug. 22, 2006

(87) PCT Pub. No.: WO2005/081346
PCT Pub. Date: Sep. 1, 2005

(65) Prior Publication Data
US 2007/0178350 A1 Aug. 2, 2007

(30) Foreign Application Priority Data
Feb. 25, 2004 (JP) .................... P2004-049718

(51) Int. Cl.
*H01M 8/10* (2006.01)
(52) U.S. Cl. .................. 429/515; 429/512; 429/513
(58) Field of Classification Search .......... 429/34, 429/515, 512
See application file for complete search history.

(56) References Cited

U.S. PATENT DOCUMENTS

| 6,506,513 B1 | 1/2003 | Yonetsu et al. | |
|---|---|---|---|
| 2003/0082421 A1* | 5/2003 | Yonetsu et al. | 429/25 |
| 2003/0138679 A1* | 7/2003 | Prased et al. | 429/19 |

FOREIGN PATENT DOCUMENTS

| JP | 2-148660 | 6/1990 | |
|---|---|---|---|
| JP | 2001-93551 | 4/2001 | |
| JP | 2002-280044 | 9/2002 | |
| JP | 2003-290645 | 10/2003 | |
| JP | 2004-127824 | 4/2004 | |
| JP | 2004-192171 | * 7/2004 | |

OTHER PUBLICATIONS

International Preliminary Report on Patentability issued in International Application No. PCT/JP2005/003019, dated Nov. 30, 2006.

* cited by examiner

*Primary Examiner* — Melvin C Mayes
*Assistant Examiner* — Colette Nguyen
(74) *Attorney, Agent, or Firm* — McDermott Will & Emery LLP

(57) ABSTRACT

A fuel tank for a fuel cell includes a fuel valve which allows a methanol water solution to pass to a fuel supply portion from a fuel injecting portion after joining a fuel cell main body and the fuel tank for the fuel cell, and shuts off the passage of the methanol water solution before the fuel supply portion and the fuel injecting portion are disconnected. Accordingly, the fuel valve is properly opened and closed, the liquid fuel does not leak out from the fuel tank for the fuel cell at a time of attaching and detaching, and it is possible to improve a safety in the fuel supply in comparison with the conventional structure.

13 Claims, 34 Drawing Sheets

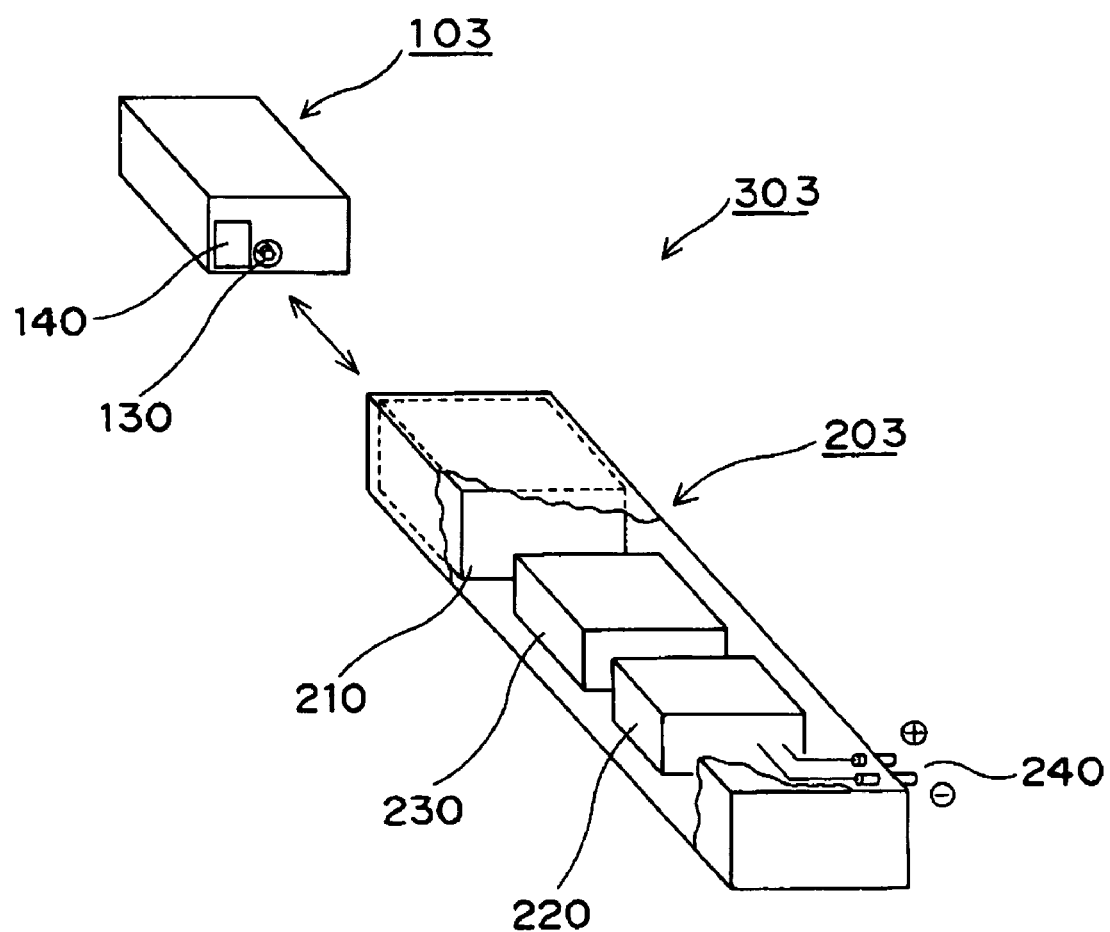

FUEL TANK FOR FUEL CELL AND FUEL CELL SYSTEM

RELATED APPLICATION

This application is a national phase of PCT/JP2005/003019 filed on Feb. 24, 2005, which claims priority from Japanese Application No. 2004-049718 filed on Feb. 25, 2004, the disclosures of which Applications are incorporated by reference herein. The benefit of the filing and priority dates of the International and Japanese Applications is respectfully requested.

TECHNICAL FIELD

The present invention relates to a fuel tank for a fuel cell which can be connected to the fuel cell, and a fuel cell system including the fuel tank for the fuel cell. It is particularly preferable that the fuel tank for the fuel cell is used in a fuel cell generating an electric power by directly supplying an organic fuel such as a methanol or the like to an anode electrode.

BACKGROUND ART

There has been advanced a propagation of a portable electronic device such as a cellular phone, a personal digital assistance, a notebook-size personal computer, a portable audio device, a portable visual device or the like. Conventionally, the portable electronic devices are driven by a primary battery or a secondary battery. Particularly, as the secondary battery, nickel-cadmium battery or a lithium-ion battery is used, and there has been developed a battery having a compact size and a high energy density. However, it is necessary that the secondary battery is charged for a fixed time by using a charging device after using a fixed amount of electric power. Accordingly, there has been proposed a fuel cell which does not require to be charged.

The fuel cell corresponds to an electric generator electrochemically converting a chemical energy of a fuel into an energy. As an example of the fuel cell mentioned above, there has been known a Polymer Electrolyte Fuel Cell (PEFC) generating an electric power by reducing a hydrogen gas in an anode electrode with using a perfluoro carbon sulfonic acid type electrolyte and reducing an oxygen in a cathode electrode. The PEFC mentioned above has a feature of being a battery having a high output density, and a development thereof is advanced.

However, in the hydrogen gas used in the PEFC, a volume energy density is low, it is necessary to increase a volume of a fuel tank, and an auxiliary device is necessary, the auxiliary device including a device for supplying a fuel gas and an oxidizing gas to a main body (an electric power generating portion) of the fuel cell, a humidifying device for stabilizing a battery performance and the like. Accordingly, since the fuel cell system becomes large in size, the PEFC is not suitable for a power source of the portable electronic device.

On the other hand, a direct methanol fuel cell (DMFC) generating an electric power by directly taking out a proton from a methanol has a defect that an output thereof is smaller in comparison with the PEFC mentioned above, however, it is possible to improve the volume energy density of the fuel and it is possible to reduce a number of the auxiliary device in the fuel cell main body. Accordingly, it is possible to make the cell compact. Therefore, the DMFC is remarked as a power source for the portable device, and several proposals have been made. The following reactions are performed in an anode electrode and a cathode electrode within a fuel cell main body in the DMFC.

Anode electrode: $CH_3OH+H_2O \rightarrow 6H^+ +6e^- +CO_2$
Cathode electrode: $6H^+ +6e^- +3/2O_2 \rightarrow 3H_2O$ As shown by the chemical formula mentioned above, a carbon dioxide is generated at the anode electrode side and a water is generated at the cathode electrode side by generating the electric power with using the fuel cell.

The fuel tank in the DMFC mentioned above is disclosed, for example, in the following patent document 1 or the like. The fuel tank in the prior art mentioned above is provided with a certification information, and is structured such that a main body reads the certification information so as to discriminate whether or not the fuel tank is correct, thereby controlling the power generation. Further, the document also discloses the matter that the discrimination whether or not the fuel tank is correct is executed by a computer in a remote location via a network.

Patent document 1: Japanese Unexamined Patent Publication No. 2002-280044

DISCLOSURE OF INVENTION

Subject to be Solved by the Invention

However, in the conventional structure in the patent document mentioned above, after the fuel tank is installed to the fuel cell main body, the fuel cell main body only reads the certification information so as to judge whether or not the fuel tank is correct. Accordingly, it is not known whether or not the fuel within the fuel tank is a predetermined fuel. Therefore, there is a possibility that the other fuel than the predetermined fuel is supplied to the fuel cell main body. Further, since any detailed structure of the fuel tank is not disclosed, it is deemed that a safety measure in the fuel supply is insufficient.

The present invention is made for solving such problem mentioned above, and an object of the present invention is to provide a fuel tank for a fuel cell in which a safety in a fuel supply is improved in comparison with the conventional structure, and a fuel cell system having the fuel tank for the fuel cell.

Means for Solving the Invention

In order to achieve the object mentioned above, the present invention is structured as follows.

In other words, in accordance with a first aspect of the present invention, there is provided a fuel tank for a fuel cell, the fuel tank accommodating a liquid fuel supplied to a fuel cell main body, and being detachable with respect to said fuel cell main body, the fuel tank comprising:

a fuel injecting portion configured to be engaged with a fuel supply portion included in said fuel cell main body and inject said liquid fuel accommodated in said fuel tank of the fuel cell; and a flow path opening and closing member configured to be provided in said fuel injecting portion, allow said liquid fuel to pass to said fuel supply portion from said fuel injecting portion after a joint between said fuel supply portion and said fuel injecting portion in connection with a connection of said fuel tank for the fuel cell to said fuel cell main body, and shut off the passage of said liquid fuel to said fuel supply portion from said fuel injecting portion before a disconnection between said fuel supply portion and said fuel injecting portion in connection with a disconnection of said fuel tank for the fuel cell from said fuel cell main body.

The flow path opening and closing member can be structured by at least one of a fuel valve and a closing valve provided in a flow path of the liquid fuel. Accordingly, the fuel injecting portion may be provided with both of the fuel valve and the closing valve, or may be provided with only one thereof. In this case, the fuel valve corresponds to a main valve in the fuel path, and the closing valve corresponds to an auxiliary valve assisting the fuel valve.

Further, in the case that the flow path opening and closing member has both of the fuel valve and the closing valve, when supplying the liquid fuel, the fuel valve corresponds to a valve operating such as to open the flow path after the closing valve opens the flow path, and shut off the flow path before the closing valve when the fuel supply portion and the fuel injecting portion are disconnected.

Further, the fuel tank for the fuel cell can have a tank portion configured to be connected to said fuel injecting portion, accommodate said liquid fuel and be made of a material which is deformable in accordance with a reduction of the contents; a casing configured to accommodate said tank portion in an inner portion so as to maintain said inner portion in an airtight state; and an air pressure balancing portion configured to be provided in said casing and balance an air pressure between inner and outer sides of said casing. In other words, in a case that the inner portion of the casing can be maintained in the airtight state, in order to supply the liquid fuel from the tank portion which is deformable in accordance with the reduction of the content, it is necessary to balance the air pressure between the inner and outer sides of the casing. In the case of having the tank portion and the casing, the air pressure balancing portion operates in such a manner as to make it possible to supply the fuel from the tank portion.

Further, in accordance with a second aspect of the present invention, there is provided a fuel cell system comprising:

a fuel tank for a fuel cell as recited in the first aspect; and
a fuel cell main body configured to be detachable with respect to said fuel tank for the fuel cell and configured to have a fuel supply portion engaging with said fuel injecting portion of said fuel tank for the fuel cell and a power generating portion generating an electric power by said supplied liquid fuel.

In the second aspect, the flow path opening and closing member provided in the fuel tank for the fuel cell may be constituted by an electromagnetic valve opening and closing the flow path on the basis of an electric signal. In this case, the fuel cell main body may be structured such as to comprise further a lock mechanism detecting that the tank for the fuel cell is installed to the fuel cell main body in such a state that the liquid fuel can be supplied to the fuel cell main body from the tank for the fuel cell, and a control portion opening and closing the electromagnetic valve in correspondence a result of detection by the lock mechanism.

Effects of the Present Invention

In accordance with the fuel tank for the fuel cell on the basis of the first aspect, the fuel tank comprises the fuel injecting portion and the flow path opening and closing member, and the flow path opening and closing member allows the liquid fuel to pass to the fuel supply portion from the fuel injecting portion after the fuel injecting portion and the fuel supply portion of the fuel cell main body are joined, in the case of connecting the fuel tank for the fuel cell to the fuel cell main body, and shuts off the passage of the liquid fuel to the fuel supply portion from the fuel injecting portion before the fuel supply portion and the fuel injecting portion are disconnected, in the case of disconnecting the fuel tank from the fuel cell main body. Accordingly, since the flow path opening and closing member is suitably opened and closed in the case that the fuel cell main body and the fuel tank for the fuel cell are attached and detached, the liquid fuel does not leak out from the fuel tank for the fuel cell at a time of attaching and detaching. Therefore, in accordance with the fuel tank for the fuel cell on the basis of the first aspect, it is possible to improve a safety in the fuel supply in comparison with the conventional structure.

Further, in the case that the flow path opening and closing member is constituted by the fuel valve, the fuel valve has a handle. Accordingly, the handle is brought into contact with a valve opening and closing member in the fuel cell main body in correspondence to attachment and detachment between the fuel cell main body and the fuel tank for the fuel cell. Therefore, it is possible to easily open and close the fuel valve by forming the handle. Further, since the handle is moved by the valve opening and closing member, the fuel valve can be opened and closed only when the fuel tank for the fuel cell coinciding with the fuel cell main body is connected to the fuel cell main body. From this point of view, it is possible to improve the safety in the fuel supply in comparison with the conventional structure.

Further, since the fuel tank for the fuel cell is provided with a handle operating mechanism, the fuel valve can be opened and closed only when the fuel tank for the fuel cell coinciding with the fuel cell main body is connected to the fuel cell main body, on the basis of an improper operation preventing member provided in the handle operating mechanism. Accordingly, the handle operating mechanism can improve the safety in the fuel supply in comparison with the conventional structure.

Further, since a member for rotation and the engaging portion are provided, a member for opening and closing the valve is rotated by the engaging portion, and the fuel valve is opened and closed by moving the member for rotation on the basis of the rotation. Accordingly, it is impossible to easily open and close the fuel valve from an external portion of the fuel tank for the fuel cell. Therefore, it is possible to improve the safety in the fuel supply in comparison with the conventional structure.

Further, since the casing of the fuel tank for the fuel cell has a concave portion accommodating the fuel injecting portion and the fuel valve, and the concave portion is provided with a shutter, the fuel injecting portion and the fuel valve are not exposed to an outer portion of the fuel tank for the fuel cell, and it is possible to prevent the liquid fuel from carelessly leaking out from the fuel tank for the fuel cell. Accordingly, it is possible to improve the safety in the fuel supply in comparison with the conventional structure.

Further, in accordance with the fuel cell system on the basis of the second aspect mentioned above, since the fuel cell system is provided with the fuel tank for the fuel cell and the fuel cell main body having the structures mentioned above, it is possible to improve the safety in the fuel supply in comparison with the conventional structure as mentioned above.

Further, since the valve opening and closing member has the predetermined length mentioned above, it is possible to open the liquid fuel flow path after joining the fuel injecting portion and the fuel supply portion, and it is possible to close the liquid fuel flow path before disconnecting the fuel injecting portion and the fuel supply portion. Accordingly, the liquid fuel does not leak out at a time of attaching and detaching the fuel tank for the fuel cell and the fuel cell main body. Therefore, in accordance with the fuel tank for the fuel cell on the basis of the first aspect, it is possible to improve the safety in the fuel supply in comparison with the conventional structure.

Further, in the case that the structure is made such that the fuel cell main body is provided with an opening and closing mechanism, the fuel valve of the fuel tank for the fuel cell has the member for rotation and the engaging portion, and the opening and closing mechanism is engaged with the engaging portion so as to move the member for rotation, it is possible to simplify the structure, and it is possible to achieve a compact structure.

Further, since a lock mechanism is provided, it is possible to prevent the fuel tank for the fuel cell from being carelessly disconnected from the fuel cell main body when the fuel tank for the fuel cell is properly installed to the fuel cell main body.

In the aspects mentioned above, the fuel supply flow path is opened and closed on the basis of a mechanical movement, however, the fuel valve in the fuel injecting portion of the fuel tank for the fuel cell may be constituted by an electromagnetic valve. In accordance with the structure, it is possible to electrically open and close the fuel supply flow path. Accordingly, it is possible to electrically detect whether or not the fuel tank for the fuel cell is installed to the fuel cell main body, and it is possible to control the opening and closing of the flow path by the electromagnetic valve.

BRIEF DESCRIPTION OF DRAWINGS

FIG. 16 is a perspective view showing a fuel cell system in accordance with a third embodiment of the present invention;

EXPLANATION OF REFERENCE NUMERALS

Figure 1:
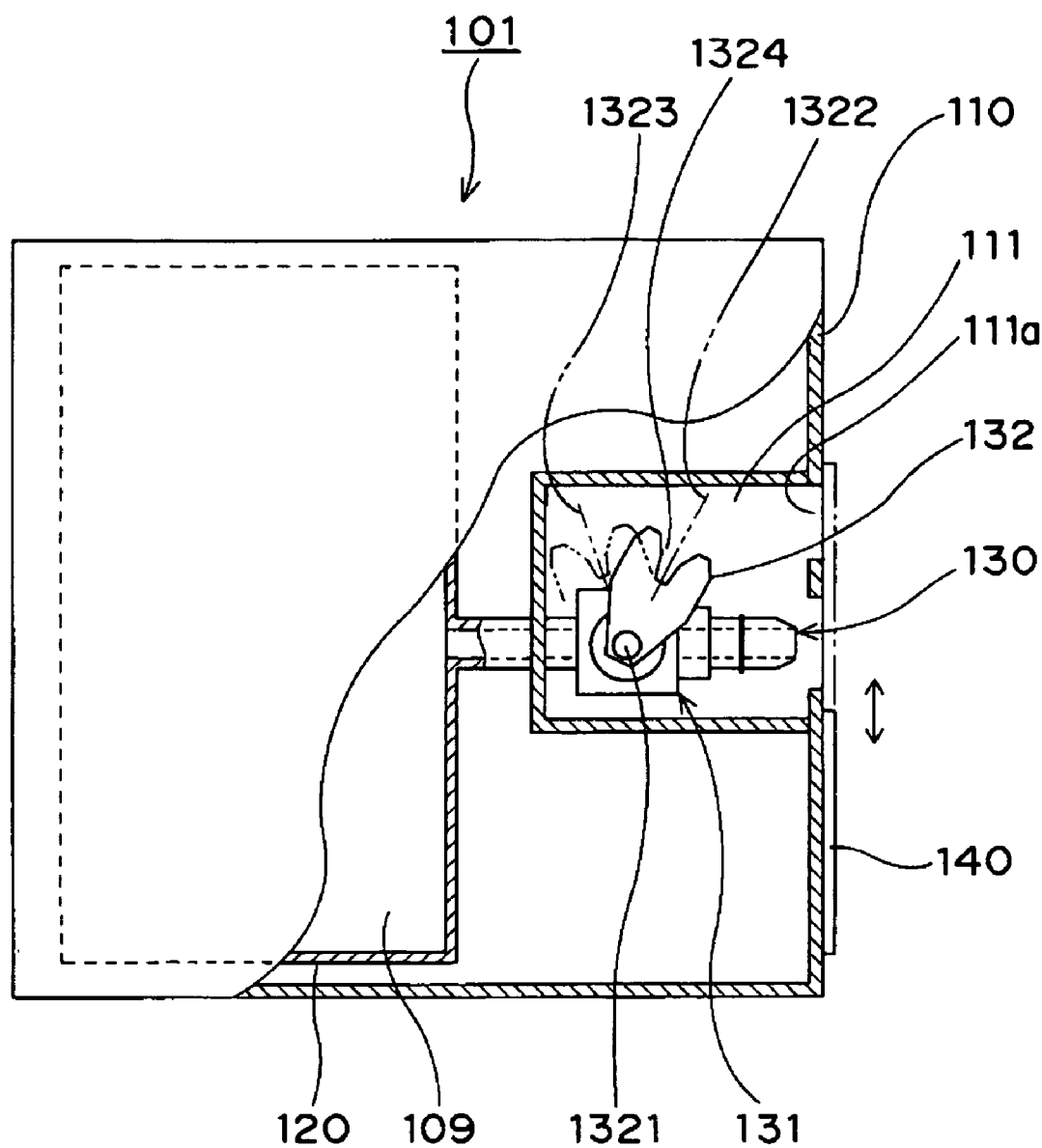
FIG. 1 is a view showing a structure of a fuel tank for a fuel cell corresponding to an embodiment in accordance with of the present invention.

101, 102, 103 . . . fuel tank for a fuel cell, 109 . . . methanol water solution, 110 . . . casing, 111 . . . concave portion, 111a . . . opening portion, 130 . . . fuel injecting portion, 131 . . . fuel valve, 132 . . . handle, 140 . . . shutter, 150 . . . handle operating mechanism, 151 . . . handle operating member, 152 . . . improper operation preventing member, 155 . . . handle operating mechanism, 180 . . . electromagnetic valve, 160 . . . second fuel valve, 161 . . . engagement portion, 170 . . . air pressure balancing portion, 201, 202, 203 . . . fuel cell main body, 213 . . . valve opening and closing member, 214 . . . fuel supply portion, 220 . . . power generating portion, 231 . . . fuel accommodating portion, 235 . . . control portion, 250 . . . valve opening and closing member, 260 . . . opening and closing mechanism, 261 . . . ring member, 262 . . . connection member, 263 . . . valve rotating member, 280, 285 . . . lock mechanism, 1611 . . . member for engagement, and 1621 . . . member for rotation.

BEST MODE FOR CARRYING OUT THE INVENTION

A description will be given below of a fuel tank for a fuel cell and a fuel cell system in accordance with embodiments of the present invention with reference to the accompanying drawings. In this case, in each of the drawings, the same reference numerals are attached to the same constituting elements.

First Embodiment

Figure 2:
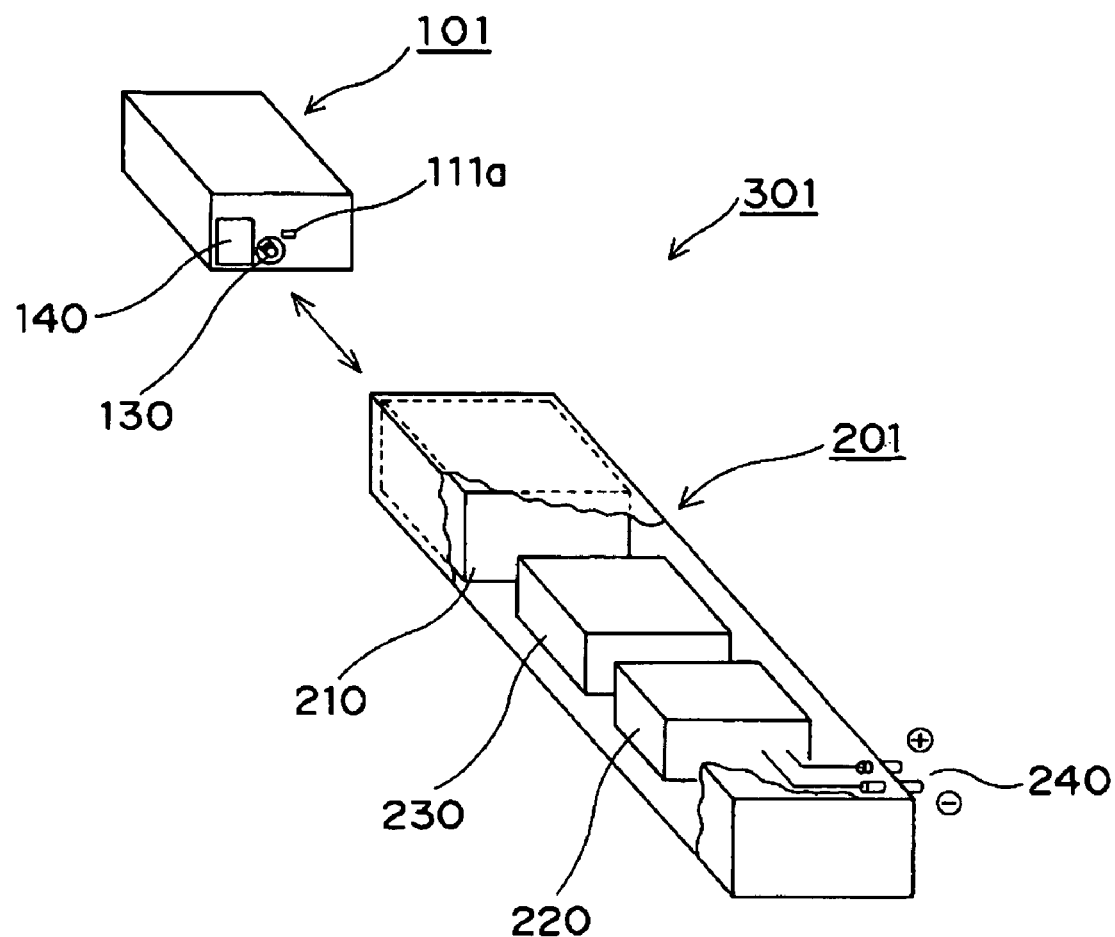
FIG. 2 is a perspective view showing a fuel cell system corresponding to the other embodiment in accordance with the present invention, which has the fuel tank for the fuel cell shown in FIG. 1, and a fuel cell main body to and from which the fuel tank for the fuel cell can be attached and detached.
Figure 13:
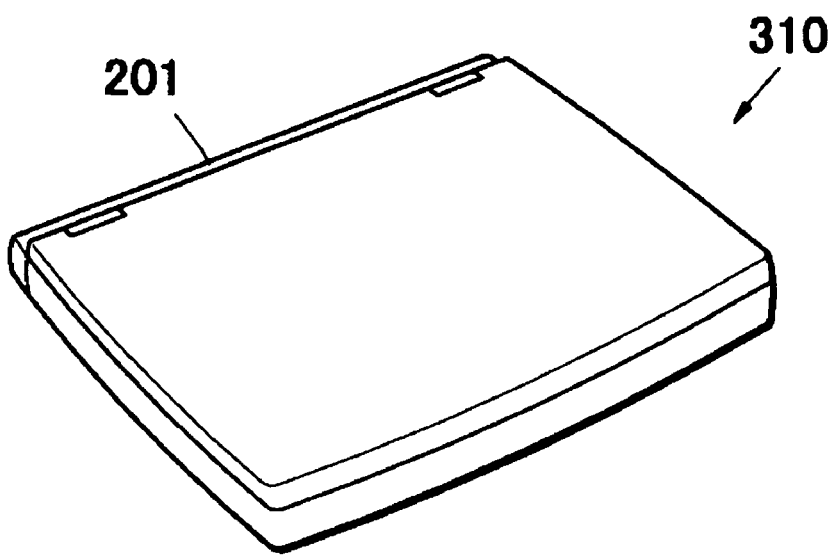
FIG. 13 is a perspective view showing a state in which the fuel cell main body in each of the embodiments is attached to a personal computer.
Figure 14:
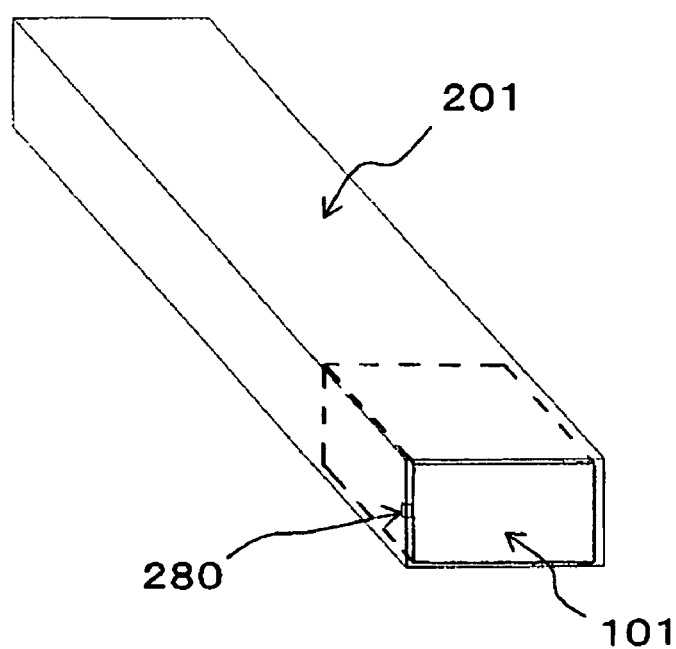
FIG. 14 is a perspective view showing a lock mechanism provided in the fuel cell system in each of the embodiments.

As shown in FIG. 2, a fuel cell system 301 in accordance with the embodiment comprises a fuel tank 101 for a fuel cell in accordance with the embodiment, and a fuel cell main body 201 to and from which the fuel tank 101 for the fuel cell can be attached and detached, and the fuel cell main body 201 comprises a fuel accommodating portion having a fuel supply portion which can be connected to the fuel tank 101 for the fuel cell. In this case, the fuel cell main body 201 can be attached to a portable electronic device, for example, a notebook-size personal computer 310 as shown in FIG. 13. Further, there is a case that the fuel cell main body 201 has a structure which is not provided with the fuel accommodating portion. In the following description, the fuel cell main body 201 is exemplified by the case having the fuel accommodating portion mentioned above.

First, a description will be given of the fuel tank 101 for the fuel cell.

As shown in FIG. 1, the fuel tank 101 for the fuel cell comprises a hollow casing 110 forming a concave portion 111 and having an approximately rectangular parallelepiped shape, a tank portion 120 accommodated within the casing 110, and a tubular fuel injecting portion 130 protruding into the concave portion 111 from the tank portion 120. The casing 110 is provided with a shutter 140 provided in an opening portion 111a of the concave portion 111 so as to open and close the concave portion 111, and the concave portion 111 is opened by moving the shutter 140 at a time of connecting the fuel tank 101 for the fuel cell to the fuel cell main body mentioned below. The concave portion 111 is closed by the shutter 140 at the other times than the connecting time. By forming the shutter 140, it is possible to prevent a dust from being mixed at a time of storing the fuel tank 101 for the fuel cell and prevent a nursling from accidentally drinking or doing mischief, etc. Further, the shutter 140 can employ a structure of opening while working with an installing motion of the fuel tank 101 for the fuel cell to the fuel cell main body 201, and it is possible to provide a more safe fuel tank 101 for the fuel cell on the basis of the structure mentioned above.

Figure 38:
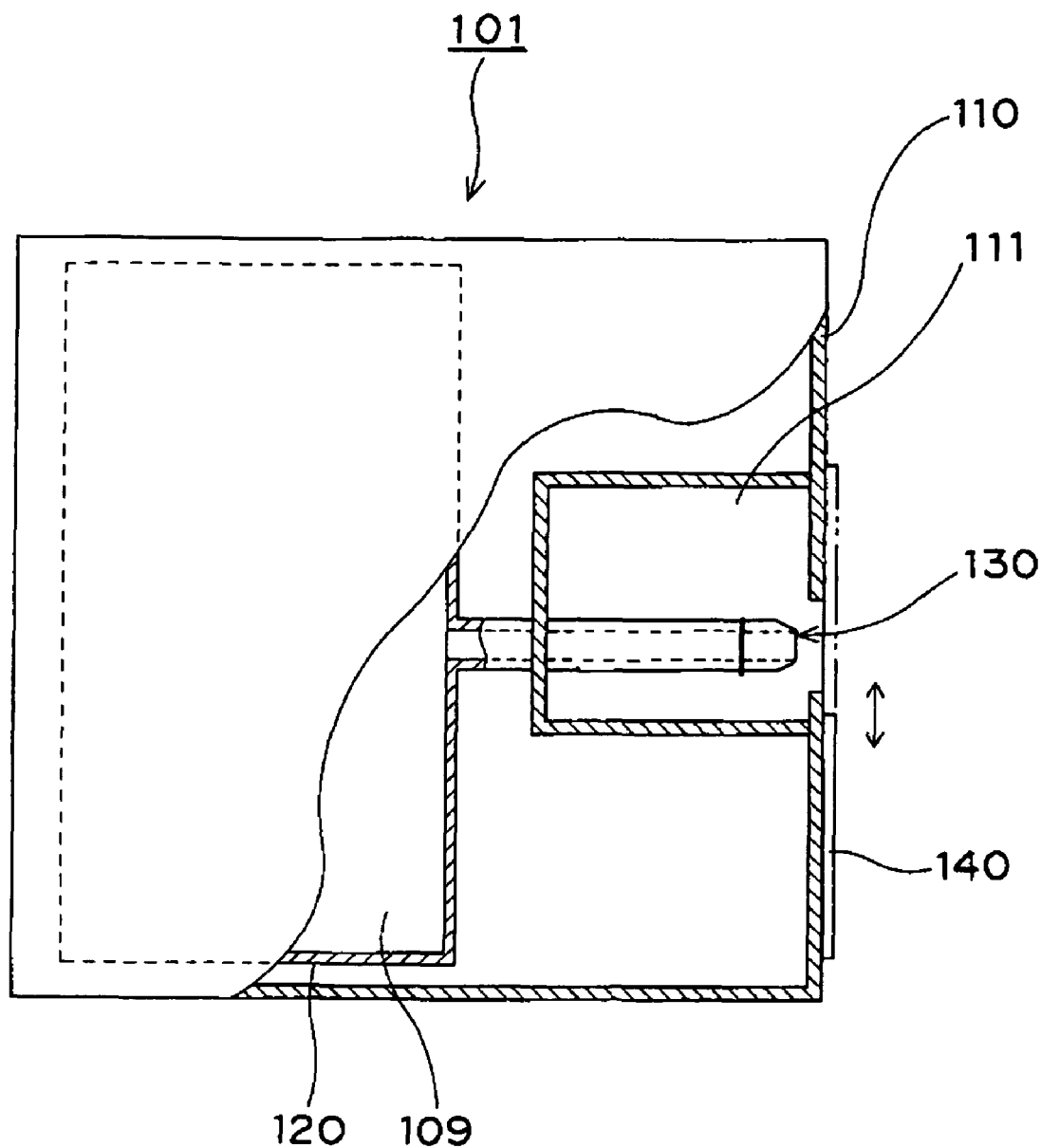
FIG. 38 is a view showing a modified example of the fuel tank for the fuel cell in each of the embodiments, in which the fuel valve is not provided.

The tank portion 120 is a container accommodating a methanol concentrate solution or a methanol water solution corresponding to a liquid fuel supplied to the fuel accommodating portion included in the fuel cell main body mentioned below, and is made, for example, of a high polymer material such as a polyethylene, a polypropylene or the like having a small thickness and being deformable, in the present embodiment. In the present embodiment, it is possible to accommodate, for example, about 100 milliliter methanol water solution 109 having 80 weight percent concentration. The fuel injecting portion 130 is structured such that one end thereof is connected to the tank portion 120, the other end thereof is provided with a closing valve 139 having a structure shown in FIG. 10, and an intermediate portion thereof has a fuel valve 131 controlling a passage of the methanol water solution 109 in the fuel injecting portion 130. In this case, the fuel valve 131 and the closing valve 139 correspond to an example which functions as a flow path opening and closing member, and there is a case that the closing valve 139 is called as an injecting portion side closing valve for being differentiated from a closing valve 2141 mentioned below, and the closing valve 2141 mentioned below is called as a supply portion side closing valve. On the other hand, since it is possible to control the passage of the methanol water solution 109 only by the closing valve 139, the structure may be made, as shown in FIG. 38, such that the fuel injecting portion 130 is provided with only the closing valve 139 without the fuel valve 131. However, in this structure, since there can be considered a possibility that the methanol water solution 190 leaks accidentally in view of the structure of the closing valve 139, it is preferable that the fuel valve 131 is further provided as in the structure mentioned above, for further improving a safety in the fuel supply. As mentioned above, in the structure in which the fuel injecting portion 130 is provided with the closing valve 139 and the fuel valve 131, since the fuel valve 131 corresponds to the valve for further improving the safety in the fuel supply, the fuel valve 131 functions as a first closing valve or a main closing valve. On the other hand, the closing valve 139 functions as a second closing valve, a sub closing valve or an auxiliary closing valve.

Figure 10:
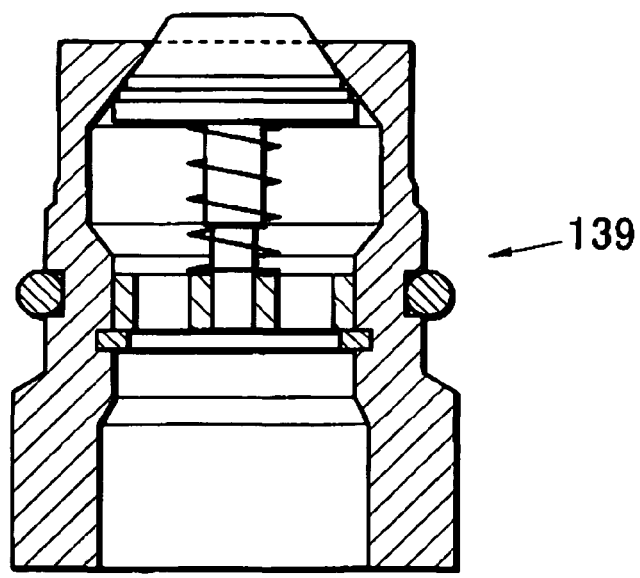
FIG. 10 is a cross sectional view of an example of a closing valve provided in the fuel tank for the fuel cell in each of the embodiments.

In this case, FIG. 1 is a schematic view and a shape or the like of the fuel injecting portion 130 is slightly different from the structure shown in FIG. 10.

The fuel valve 131 has a structure of a so-called ball valve in this embodiment, allows the methanol water solution 109 to pass to the fuel supply portion from the fuel injecting portion 130 after joining the fuel supply portion mentioned below and the fuel injecting portion 130 in accordance with the connection of the fuel tank 101 for the fuel cell to the fuel cell main body mentioned above, and shuts off the passage of the methanol water solution 109 to the fuel supply portion from the fuel injecting portion 130 before disconnecting the fuel supply portion and the fuel injecting portion 130 in accordance with the disconnection of the fuel tank 101 for the fuel cell from the fuel cell main body. The fuel valve 131 mentioned above has a handle 132 for opening and closing the flow path of the methanol water solution 109 in the fuel injecting portion 130. The handle 132 is fixed to a rotation shaft 1321 connected to a ball portion for opening and closing the flow path in the fuel valve 131, and rotates between a closed position 1322 and an opened position 1323 around the rotation shaft 1321. Further, the handle 132 is formed in a forked shape forming a concave portion 1324 capable of engaging with a member for opening and closing the valve mentioned below, as illustrated in the present embodiment.

Next, a description will be given of the fuel cell main body 201.

The fuel cell main body 201 is of a type generating an electric power by supplying a liquid fuel such as an organic solution such as a methanol, a dimethyl ether or the like, and in the present embodiment, is of a DMFC type mentioned above in which the methanol water solution is set to the fuel. The fuel cell main body 201 comprises a tank accommodating portion 210 to which the fuel tank 101 for the fuel cell is inserted, a power generating portion 220, a power generation auxiliary portion 230 connected to the power generating portion 220, and an output electrode portion 240 connected to the power generating portion 220, on the basis of a broad classification as shown in FIG. 2.

The power generating portion 220 has an anode electrode, a cathode electrode and an electrolyte membrane arranged while being pinched between the anode electrode and the cathode electrode, which correspond to general constituting parts of the DMFC. The anode electrode is structured such that a catalyst decomposing the fuel and drawing out an electron, a diffusion layer of the fuel and a separator serving as a collector are laminated, and the methanol water solution is supplied to the anode electrode by the power generation auxiliary portion 230. The cathode electrode is structured such that a reaction catalyst between a proton and an oxygen, a diffusion layer of an air, and a separator serving as a collector are laminated, and an air or an oxygen serving as a gas oxidizing agent is supplied to the cathode electrode by the power generation auxiliary portion 230. The catalyst mentioned above employs a catalyst in which a platinum and a ruthenium are dispersed and carried to a carbon powder catalyst carrier, for the anode electrode, and employs a catalyst in which a platinum fine particle is dispersed and carried to a carbon powder catalyst carrier, for the cathode electrode.

Figure 3:
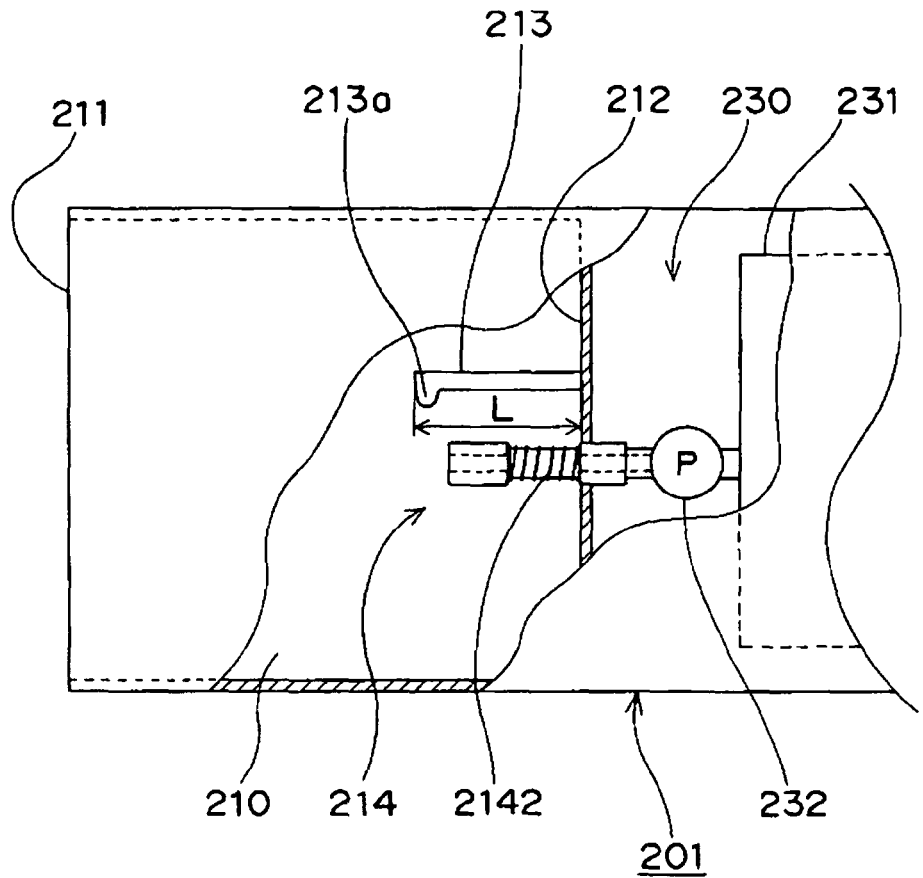
FIG. 3 is a view showing a fuel supply portion in the fuel cell main body shown in FIG. 2.

The power generation auxiliary portion 230 has a fuel accommodating portion 231 as shown in FIG. 3, and comprises a device such as a fuel pump, an air pump or the like necessary for generating an electric power in the power generating portion 220 such as supplying the methanol water solution and the gas oxidizing agent to the power generating portion 220, recovering the water from the power generating portion 220 or the like, and a piping.

The tank accommodating portion 210 is formed in a concave shape having an opening 211 to which the fuel tank 101 for the fuel cell can be inserted, as shown in FIG. 3. In this case, the fuel tank 101 for the fuel cell is oriented in such a manner that the opening portion 111a of the concave portion 111 faces to the tank accommodating portion 210 so as to be inserted. A rod-like valve opening and closing member 213 is provided in a protruding manner at a bottom surface 212 of the tank accommodating portion 210 facing to the opening 111a, and a tubular fuel supply portion 214 protrudes to the tank accommodating portion 210 side while passing through the bottom surface 212 from the power generation auxiliary portion 230.

The fuel tank 101 for the fuel cell is attached to and detached from the tank accommodating portion 210, whereby the valve opening and closing member 213 moves forward and backward within the concave portion 111 through the opening portion 111a of the fuel tank 101 for the fuel cell, and engages with the handle 132 of the fuel valve 131 mentioned above. The valve opening and closing member 213 rotates the handle 132 from the closed position 1322 to the opened position 1323 at the connecting time, and rotates the handle 132 from the opened position 1323 to the closed position 1322 at the disconnecting time. In order to make it possible to engage with the concave portion 1324 of the fork-shaped handle 132, the valve opening and closing member 213 has a protruding portion 213a in a leading end portion thereof. Further, a length L of the valve opening and closing member 213 corresponds to a length for opening the liquid fuel flow path with respect to the handle 132 after the fuel injecting portion 130 of the fuel tank 101 for the fuel cell and the fuel supply portion 214 of the fuel cell main body 201 are joined, and closing the liquid fuel flow path with respect to the handle 132 before the fuel injecting portion 130 and the fuel supply portion 214 are disconnected. Further, as a structure for opening the liquid fuel flow path after joining the fuel injecting portion 130 of the fuel tank 101 for the fuel cell and the fuel supply portion 214 of the fuel cell main body 201, and closing the liquid fuel flow path before disconnecting the fuel injecting portion 130 and the fuel supply portion 214, the piping portion having the fuel supply portion 214 has a structure of freely expanding and contracting in an axial direction thereof, in the present embodiment.

Figure 11:
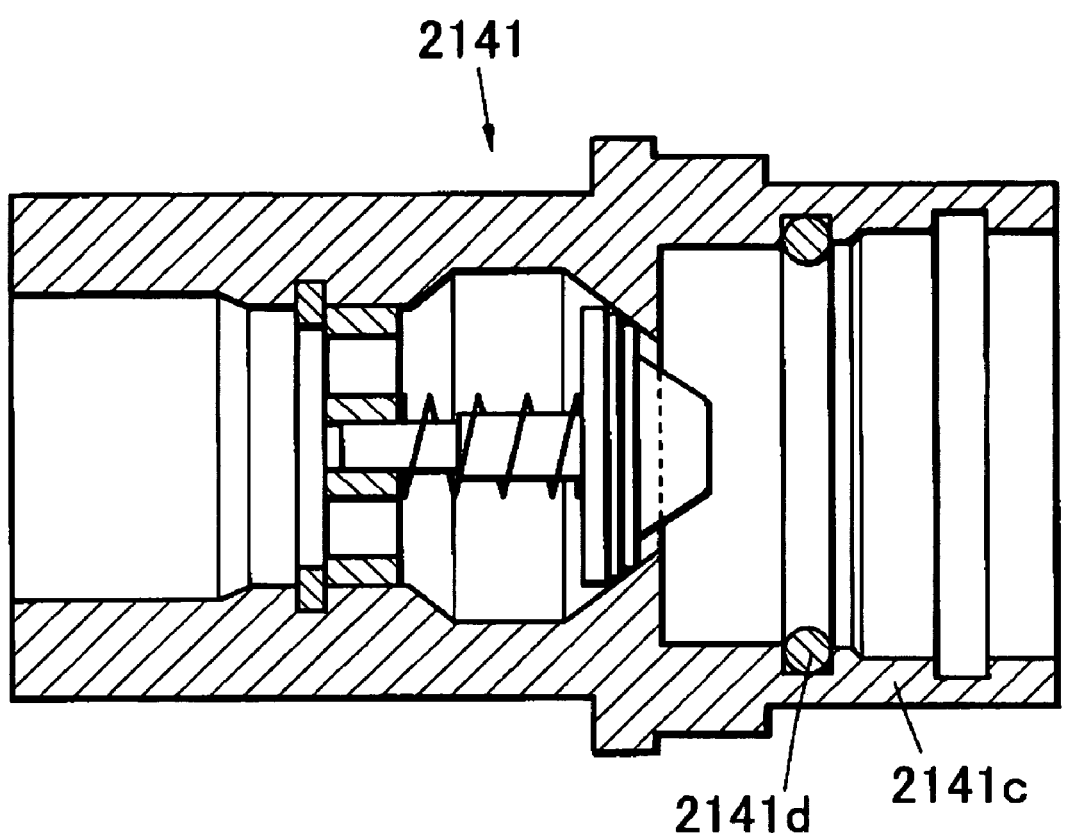
FIG. 11 is a cross sectional view of an example of a closing valve provided in the fuel cell main body in each of the embodiments.
Figure 12:
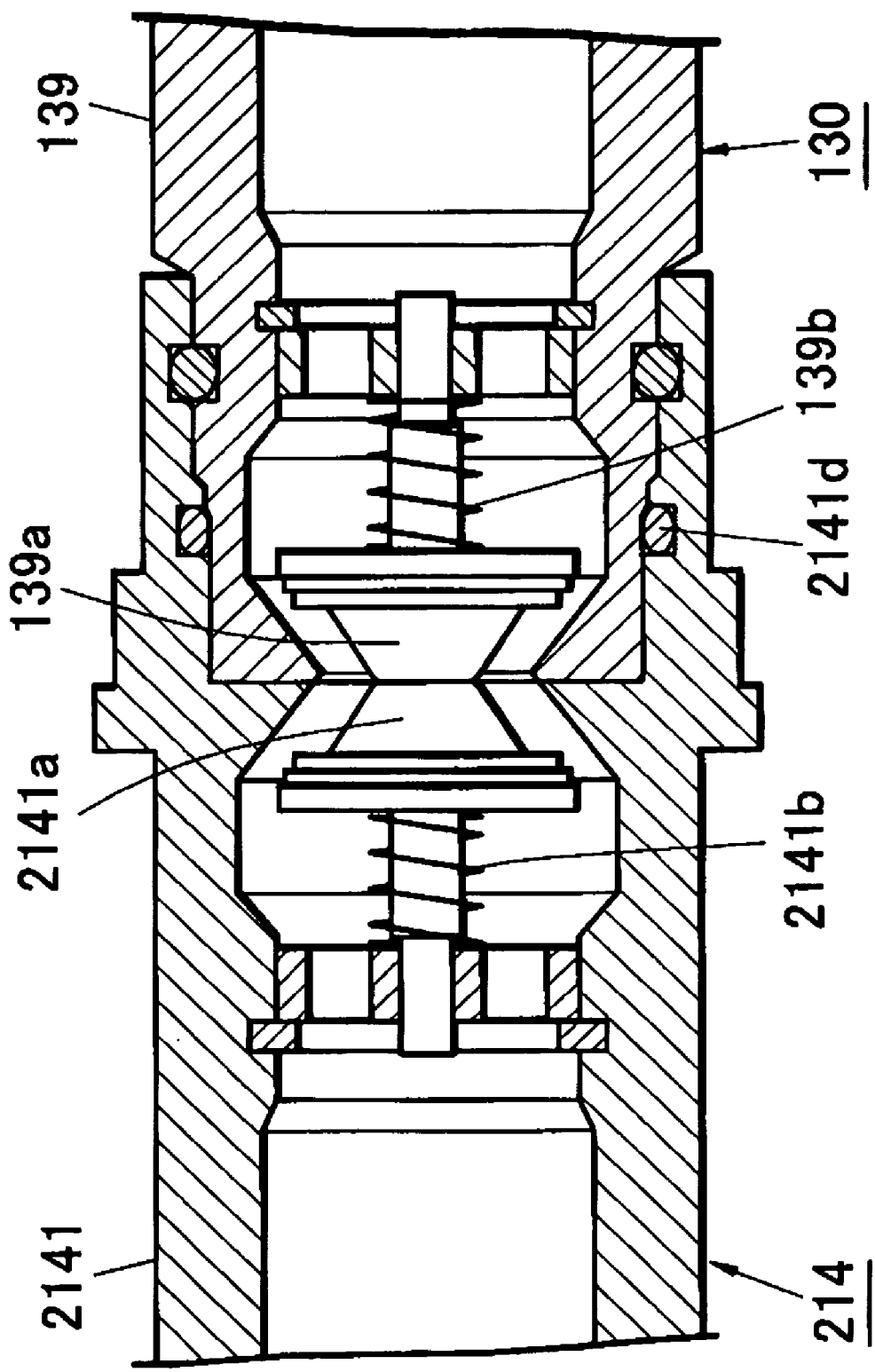
FIG. 12 is a cross sectional view showing a state in which the respective closing valves shown in FIGS. 10 and 11 are coupled.

The fuel supply portion 214 has a closing valve 2141 in which one end of the valve is connected to the power generating auxiliary portion 230 and the other end has a structure shown in FIG. 11, as shown in FIG. 3. In this case, FIG. 3 is a skeleton view, and a shape or the like of the fuel supply portion 214 is slightly different from the drawing shown in FIG. 11. Further, a spring 2142 corresponding to an example of an expansion member capable of expanding and contracting the other end is attached in an axial direction of the fuel supply portion 214. In this case, when the fuel tank 101 for the fuel cell is connected to the fuel cell main body 201, that is, when the fuel injecting portion 130 and the fuel supply portion 214 are coupled, the closing valve 139 provided in the fuel injecting portion 130 and the closing valve 2141 provided in the fuel supply portion 214 are brought into contact with each other in respective convex portions 139a and 2141a as shown in FIG. 12, and both flow paths in the fuel injecting portion 130 and the fuel supply portion 214 are opened. Of course, when the fuel injecting portion 130 and the fuel supply portion 214 are disconnected, the convex portions 139a and 2141a are returned to the original state on the basis of an operation of springs 139b and 2141b energizing the convex portions 139a and 2141a, and both the flow paths are closed.

Further, as shown in FIG. 3, a fuel pump 232 is connected to the fuel supply portion 214. In the case that the fuel pump 232 has a valve function of opening and closing the flow path, there is considered that the methanol water solution 109 existing in the power generation auxiliary portion 230 and the power generating portion 220 does not flow back and does not leak out from the fuel supply portion 214. Accordingly, the closing valve 2141 provided in the fuel supply portion 214 functions as an auxiliary valve. Therefore, it is possible to employ a structure in which the closing valve 2141 is not provided in the fuel supply portion 214.

In the fuel tank 101 for the fuel cell and the fuel cell main body 201 structured as mentioned above, a description will be given of a fuel filling operation to the fuel cell main body 201 from the fuel tank 101 for the fuel cell with reference to FIGS. 4a to 4d. In this case, FIGS. 4a to 4d illustrate only a main portion relating to the fuel injecting portion 130 and the fuel supply portion 214.

Figure 4A:
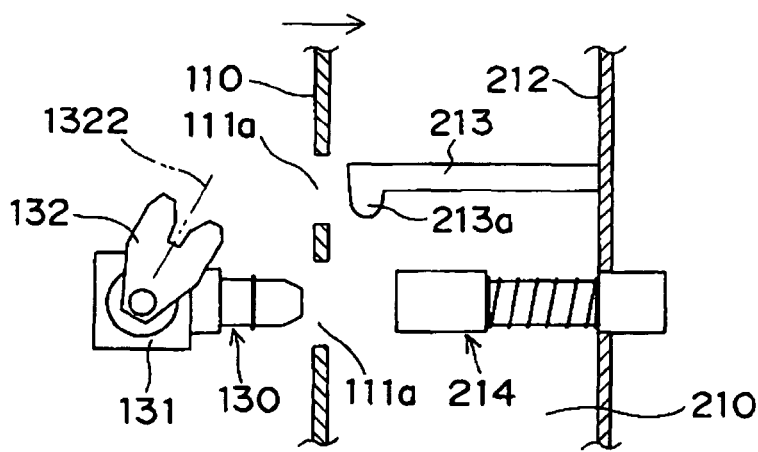
FIG. 4a is a view for explaining a state in which the fuel tank for the fuel cell and the fuel cell main body shown in FIG. 2 are joined.
Figure 4B:
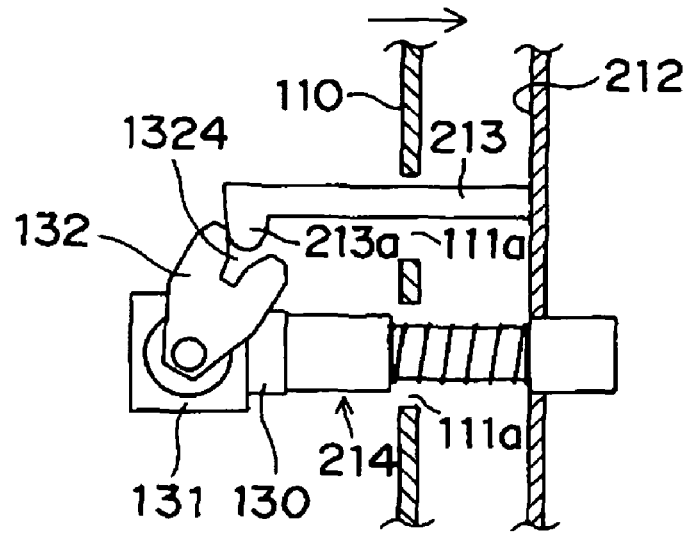
FIG. 4b is a view for explaining a state in which the fuel tank for the fuel cell and the fuel cell main body shown in FIG. 2 are joined.

After opening the shutter 140 of the fuel tank 101 for the fuel cell, the fuel tank 101 for the fuel cell is orientated and inserted to the tank accommodating portion 210 in such a manner that the opening portion 111a of the concave portion 111 in the fuel tank 101 for the fuel cell faces to the bottom surface 212 of the tank accommodating portion 210 of the fuel cell main body 201, as shown in FIG. 4a. In accordance that the fuel tank 101 for the fuel cell moves forward within the tank accommodating portion 210, the valve opening and closing member 213 and the fuel supply portion 214 pass through the opening portion 111a of the fuel tank 101 for the fuel cell, and the protruding portion 213a of the valve opening and closing member 213 is brought into contact and engaged with the concave portion 1324 of the handle 132 of the fuel valve 131 in the fuel tank 101 for the fuel cell. The handle 132 is positioned at the closed position 1322 at this time. Further, when the valve opening and closing member 213 is brought into contact with the handle 132, the fuel injecting portion 130 of the fuel tank 101 for the fuel cell and the fuel supply portion 214 of the fuel cell main body 201 are already joined as illustrated, and the closing valves 139 and 2141 in both elements are in an open state as shown in FIG. 12. In this case, when the closing valve 139 and the closing valve 2141 starts opening the flow path, the fuel injecting portion 130 and the fuel supply portion 214 do not achieve a complete joined state strictly. However, as is apparent from FIGS. 11 and 12, a leading end portion 2141c of the closing valve 2141 is formed in a concave shape so as to enwrap and engage the closing valve 139 in the present embodiment, and the leading end portion 2141c is provided with an O-ring 2141d serving as a seal member for preventing a leakage of the methanol water solution 109 even in an incomplete joined state. Accordingly, it can be judged that the closing valve 139 and the closing valve 2141 open the flow path after the fuel injecting portion 130 and the fuel supply portion 214 are coupled and joined.

Figure 4C:
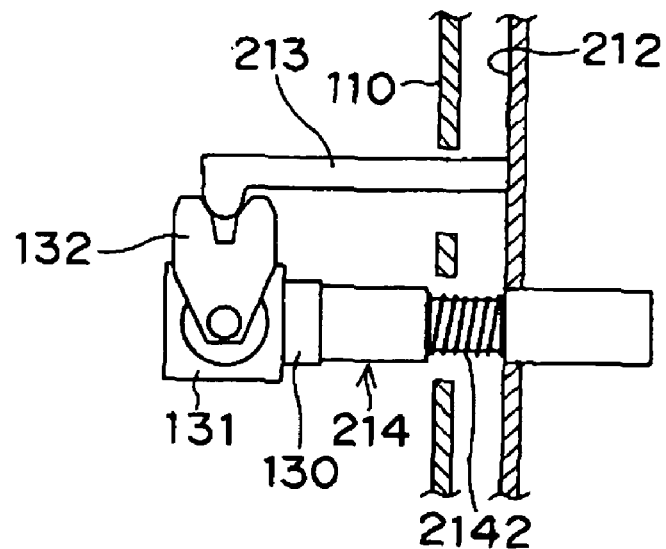
FIG. 4c is a view for explaining a state in which the fuel tank for the fuel cell and the fuel cell main body shown in FIG. 2 are joined.

In accordance that the fuel tank 101 for the fuel cell further moves forward within the tank accommodating portion 210, the valve opening and closing member 213 in which the protruding portion 213a is engaged with the concave portion 1324 of the handle 132 rotates the handle 132 from the closed position 1322 to the opened position 1323 side, as shown in FIG. 4c. In this case, in accordance with the forward movement, the expandable fuel supply portion 214 is going to be contracted against the energizing force of the spring 2142.

Figure 4D:
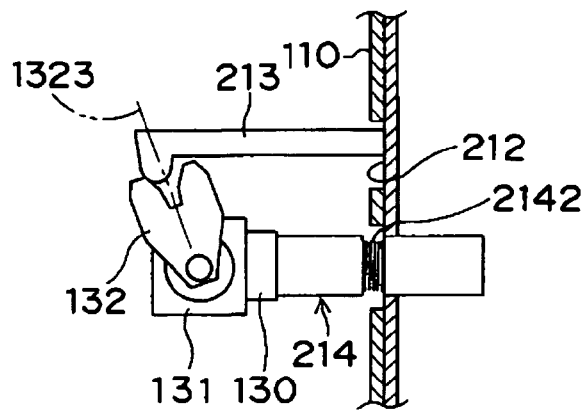
FIG. 4d is a view for explaining a state in which the fuel tank for the fuel cell and the fuel cell main body shown in FIG. 2 are joined.

Further, as shown in FIG. 4d, when the opening portion 111a of the fuel tank 101 for the fuel cell reaches the bottom surface 212 of the tank accommodating portion 210 of the fuel cell main body 201, the valve opening and closing member 213 rotates the handle 132 more so as to position at the opened position 1323.

Accordingly, the liquid fuel flow path in the fuel valve 131 in the fuel tank 101 for the fuel cell is opened, and the methanol water solution 109 within the tank portion 120 of the fuel tank 101 for the fuel cell can be supplied to the fuel accommodating portion 231 of the fuel cell main body 201 through the fuel injecting portion 130 and the fuel supply portion 214. The fuel supply is performed, for example, by sucking out the methanol water solution 109 within the fuel tank 101 for the fuel cell by means of the fuel pump 232 shown in FIG. 3 provided in the power generation auxiliary portion 230. Since the tank portion 120 is made of a thin high polymer material, the tank portion 120 can supply the methanol water solution 109 by being deformed. In this case, since the casing 110 of the fuel tank 101 for the fuel cell having the tank portion 120 does not have a structure of positively holding an internal sealing performance and an airtightness, the air can comparatively freely come in and out between inner and outer sides of the casing 110. Therefore, the tank portion 120 can be deformed so as to be depressed within the casing 110 in accordance with the supply of the methanol water solution 109.

As shown in FIG. 4d, it is preferable that the fuel tank 101 for the fuel cell and the fuel cell main body 201 have a lock mechanism 280 as shown in FIGS. 14 and 15a to 15c for fixing the fuel tank 101 for the fuel cell and the fuel cell main body 201, at a time when the fuel tank 101 for the fuel cell is completely installed to the fuel cell main body 201, that is, when the fuel tank 101 for the fuel cell is normally installed to the fuel cell main body 201, and is installed in a state in which the liquid fuel can be supplied to the fuel cell main body 201 from the fuel tank 101 for the fuel cell.

The lock mechanism 280 mentioned above has a hook portion 281 which is arranged in the fuel cell main body 201 side in the present embodiment and is slidable along the side surface of the fuel cell main body 201, and a concave portion 282 which is arranged in the fuel tank 101 for the fuel cell side and engages with the hook portion 281. In this case, the hook portion 281 is provided with a spring 283 corresponding to an example of the energizing member energizing the hook portion 281 to the fuel tank 101 for the fuel cell side.

Figure 15A:
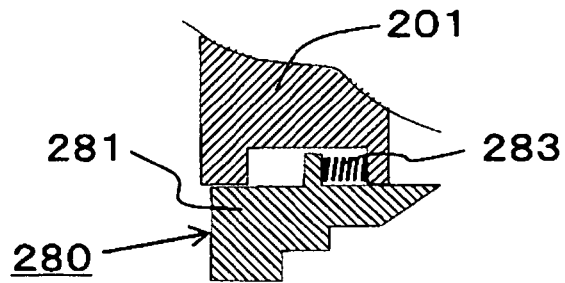
FIG. 15a is a view for explaining an operation of the lock mechanism shown in FIG. 14.
Figure 15B:
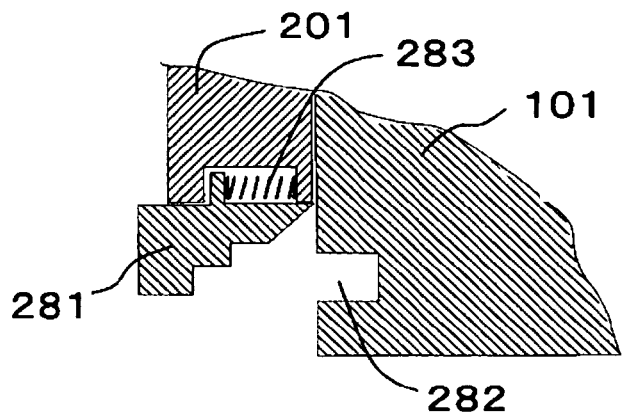
FIG. 15b is a view for explaining an operation of the lock mechanism shown in FIG. 14.
Figure 15C:
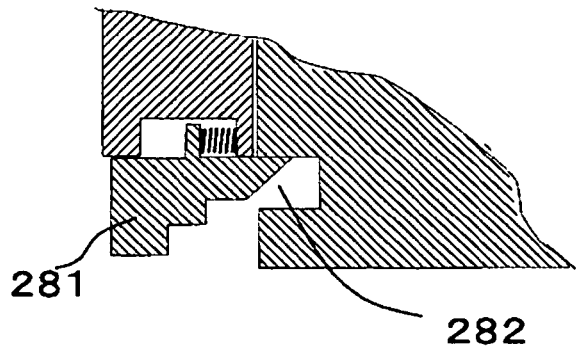
FIG. 15c is a view for explaining an operation of the lock mechanism shown in FIG. 14.

In the lock mechanism 280 mentioned above, when the fuel tank 101 for the fuel cell is not inserted to the tank accommodating portion 210 of the fuel cell main body 201, the hook portion 281 protrudes to the inner side of the tank accommodating portion 210 on the basis of the energizing force of the spring 283, as shown in FIG. 15a. When the fuel tank 101 for the fuel cell is inserted to the tank accommodating portion 210, the hook portion 281 is pushed up against the energizing force of the spring 283, as shown in FIG. 15b. Further, at a time when the fuel tank 101 for the fuel cell is completely inserted to the tank accommodating portion 210, the hook portion 281 faces to the concave portion 282 in the side of the fuel tank 101 for the fuel cell, and is engaged with the concave portion 282 on the basis of the energizing force of the spring 283, as shown in FIG. 15c. On the basis of the engagement mentioned above, the fuel tank 101 for the fuel cell is locked in a state of being completely inserted to the tank accommodating portion 210.

In the case of disconnecting the fuel tank 101 for the fuel cell from the fuel cell main body 201, the fuel tank 101 for the fuel cell is drawn out from the tank accommodating portion 210 by moving the hook portion 281 in an opposite direction to the concave portion 282 against the energizing force of the spring 283 in accordance with an inverse procedure to that mentioned above.

In this case, the lock mechanism 280 mentioned above can be employed in each of the embodiments mentioned below. Further, the lock mechanism 280 may be provided with an electric contact so as to display whether or not the fuel tank 101 for the fuel cell is installed to the fuel cell main body 201, or may be provided with a circuit or a mechanism which do not allow the fuel cell main body 201 to generate an electric power unless the fuel tank 101 for the fuel cell is installed.

After supplying the fuel, the lock is disengaged as mentioned above, and the fuel tank 101 for the fuel cell is disconnected from the fuel cell main body 201. At this time, an operation relation between the valve opening and closing member 213 and the handle 132 changes in an inverse manner to that mentioned above, that is, so as to go from FIG. 4d to FIG. 4a. Briefly describing, the handle 132 positioned at the opened position 1323 is positioned at the closed position 1322 by the valve opening and closing member 213 engaging with the concave portion 1324 of the handle 132 in the order of FIG. 4c and FIG. 4b in accordance with the disconnecting operation mentioned above. Further, after the handle 132 is positioned at the closed position 1322, the fuel injection portion 130 and the fuel supply portion 214 are disconnected. In this case, the closing valves 139 and 2141 in both elements become in the closed position corresponding to the original state as shown in FIGS. 10 and 11, on the basis of the disconnection between the fuel injecting portion 130 and the fuel supply portion 214.

As mentioned above, according to the fuel tank 101 for the fuel cell of the present embodiment, and the fuel cell system 301 including the fuel tank 101 for the fuel cell and the fuel cell main body 201, the fuel valve 131 provided in the fuel tank 101 for the fuel cell allows the methanol water solution 109 to pass from the fuel injecting portion 130 to the fuel supply portion 214 after the fuel injecting portion 130 of the fuel tank 101 for the fuel cell and the fuel supply portion 214 of the fuel cell main body 201 are joined, in the case of connecting the fuel tank 101 for the fuel cell to the fuel cell main body 201. Further, in the case of disconnecting the fuel tank 101 for the fuel cell from the fuel cell main body 201, the fuel valve 131 shuts off the passage of the methanol water solution 109 to the fuel supply portion 214 from the fuel injecting portion 130 before the fuel supply portion 214 and the fuel injecting portion 130 are disconnected. As mentioned above, since the fuel valve 131 is properly opened and closed at a time when the fuel cell main body 201 and the fuel tank 101 for the fuel cell are attached and detached, the methanol water solution 109 of the liquid fuel does not leak out from the fuel tank 101 for the fuel cell at a time of attaching and detaching as mentioned above. Therefore, it is possible to improve the safety in the fuel supply in comparison with the conventional structure.

In the embodiment mentioned above, the structure is made such that the protruding portion 213a is provided in the valve opening and closing member 213, the concave portion 1324 is provided in the handle 132, and they are engaged, however, a concavo-convex relation is not limited to that structure.

Further, the present embodiment exemplifies the case that the fuel injecting portion 130 is provided with both of the fuel valve 131 and the closing valve 139, however, the same effect can be achieved even in the case that only the closing valve 139 is provided as mentioned above. In other words, the closing valve 139 allows the methanol water solution 109 to pass from the fuel injecting portion 130 to the fuel supply portion 214 after the fuel injecting portion 130 of the fuel tank 101 for the fuel cell and the fuel supply portion 214 of the fuel cell main body 201 are joined, in the case of connecting the fuel tank 101 for the fuel cell to the fuel cell main body 201, on the basis of the cooperation with the closing valve 2141 provided in the fuel cell main body 201. Further, in the case of disconnecting the fuel tank 101 for the fuel cell from the fuel cell main body 201, the closing valve 130 shuts off the passage of the methanol water solution 109 from the fuel injecting portion 130 to the fuel supply portion 214 before the fuel supply portion 214 and the fuel injecting portion 130 are disconnected. As mentioned above, since the closing valve 139 is properly opened and closed at a time when the fuel cell main body 201 and the fuel tank 101 for the fuel cell are attached and detached, the methanol water solution 109 of the liquid fuel does not leak out from the fuel tank 101 for the fuel cell at a time of attaching and detaching as mentioned above. Therefore, it is possible to improve the safety in the fuel supply in comparison with the conventional structure. Further, the effect obtained by the closing valve 139 can be achieved in the same manner even in the case that only the closing valve 139 is provided without the fuel valve, in each of embodiments mentioned below.

Further, the present embodiment exemplifies the case that the tank portion 120 of the fuel tank 101 for the fuel cell is made of the thin high polymer material, however, in the case of being made of a high polymer material having a larger thickness and being hard to be deformed, the structure may be made such that the methanol water solution 109 is supplied to the fuel cell main body 201 by initially sealing the compressed gas such as the air or the like within the tank portion 120. In this case, it is necessary that the casing 110 of the fuel tank 101 for the fuel cell having the tank portion 120 has a structure of positively holding the internal sealing and airtightness.

The present embodiment exemplifies the case that the plug type closing valve 139 is used in the fuel injecting portion 130, and the socket type closing valve 2141 is used in the fuel supply portion 214, however, in the present embodiment and each of embodiments described below, the socket type closing valve 2141 can be used in the fuel injecting portion 130, and the plug type closing valve 139 can be used in the fuel supply portion 214.

Second Embodiment

Next, a description will be given of a second embodiment corresponding to a modified example of the fuel cell system 301 mentioned above.

Figure 7:
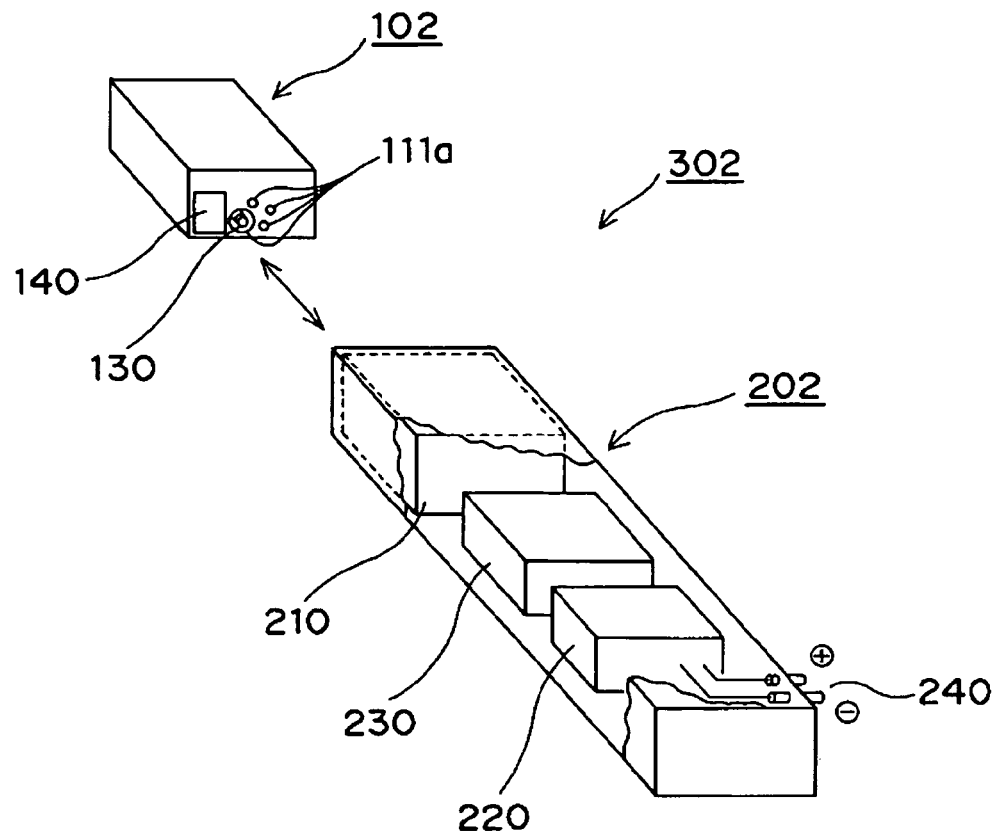
FIG. 7 is a perspective view showing a fuel cell system having the fuel tank for the fuel cell and the fuel cell main body shown in FIGS. 5 and 6.

As shown in FIG. 7, a fuel cell system 302 corresponding to one of the second embodiment comprises a fuel tank 102 for a fuel cell corresponding to a modified example of the fuel tank 101 for the fuel cell mentioned above, and a fuel cell main body 202 corresponding to a modified example of the fuel cell main body 201 mentioned above. In this case, the same reference numerals are attached to the same constituting elements as those of the embodiment mentioned above, and a description thereof will not be repeated.

Figure 5:
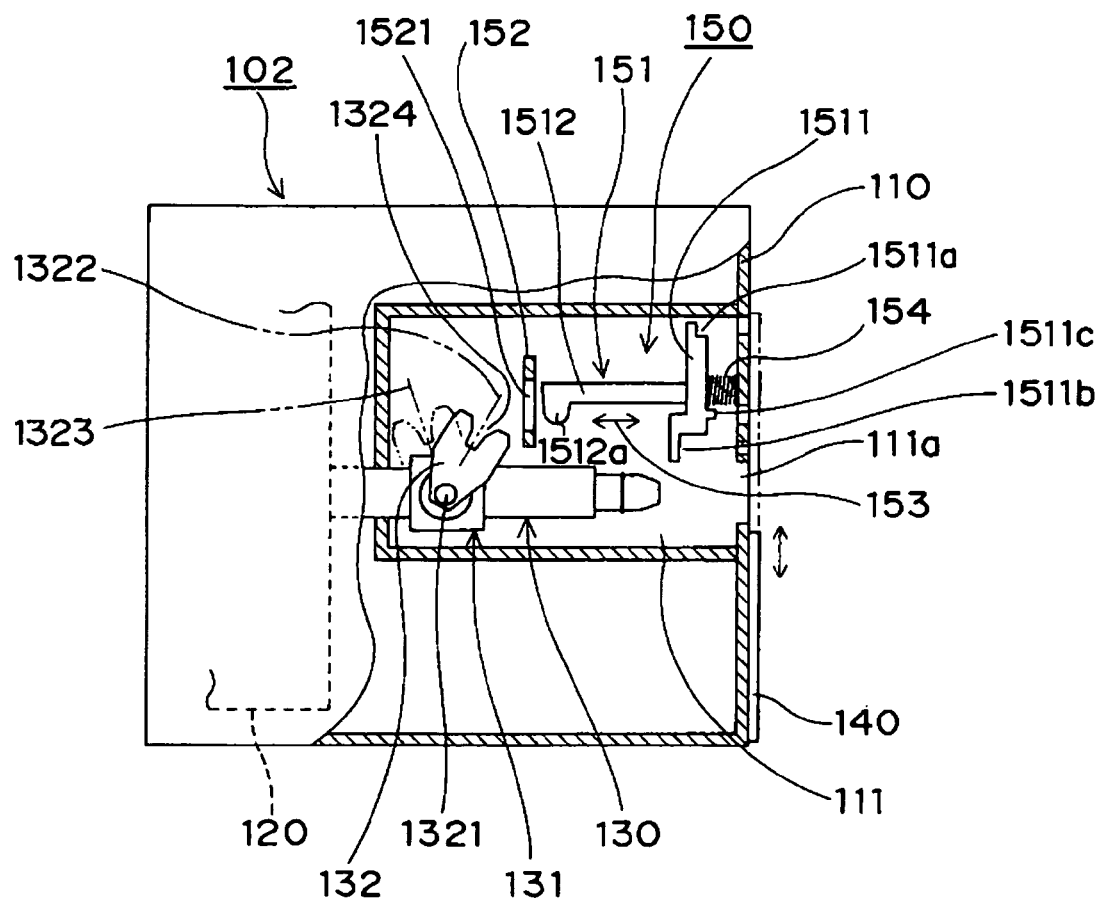
FIG. 5 is a view showing a structure in a fuel tank for a fuel cell in accordance with a second embodiment of the present invention.

The fuel tank 102 for the fuel cell is further provided with a handle operating mechanism 150 at a position capable of operating the handle 132 within the concave portion 111, as shown in FIG. 5. The other structures in the fuel tank 102 for the fuel cell are not different from the fuel tank 101 for the fuel cell.

The handle operating mechanism 150 has a handle operating member 151 and an improper operation preventing member 152. The handle operating member 151 is a member which is moved in a direction of an arrow 153 by a valve opening and closing member mentioned below provided in the fuel cell main body 202 in accordance with the attachment and detachment between the fuel cell main body 202 and the fuel tank 102 for the fuel cell, and is brought into contact with the handle 132 and then opens and closes the flow path for the fuel cell in the fuel valve 131. The handle operating member 151 mentioned above has a contact portion 1511 with which the valve opening and closing member mentioned below in the fuel cell main body 202 is brought into contact, and an operating member 1512 protruded on the contact portion 1511, having a protruding portion 1512a in a leading end portion and formed in the same shape as that of the valve opening and closing member 213 mentioned above. The handle operating member 151 is installed within the concave portion 111 in such a manner as to move the handle 132 in a direction of an arrow 153 between the closed position 1322 and the opened position 1323, and is normally energized to the opening portion 111a side of the concave portion 111 by the spring 154 corresponding to one example of the energizing member. The contact portion 1511 has concave portions 1511a and 1511b and a convex portion 1511c in correspondence to the valve opening and closing member having a predetermined shape, in such a manner as to be movable in the direction of the arrow 153 only when the valve opening and closing member having the predetermined shape is brought into contact therewith as mentioned below.

The improper operation preventing member 152 is a member allowing the handle operating member 151 to move in the direction of the arrow 153, only at a time of connecting the fuel tank 102 for the fuel cell complying with the fuel cell main body 202 to the fuel cell main body 202, that is, only at a time when the fuel tank 102 for the fuel cell provided with the handle operating member 151 having the contact portion 1511 complying with the valve opening and closing member having the predetermined shape is connected to the fuel cell main body 202 having the valve opening and closing member having the predetermined shape. The improper operation preventing member 152 mentioned above has an opening 1521 allowing the handle operating member 151 to pass, only at a time when the handle operating member 151 moves in the direction of the arrow 153, that is, only at a time when the fuel tank 102 for the fuel cell provided with the handle operating member 151 having the contact portion 1511 complying with the valve opening and closing member having the predetermined shape is connected to the fuel cell main body 202 having the valve opening and closing member having the predetermined shape mentioned above.

Figure 6:
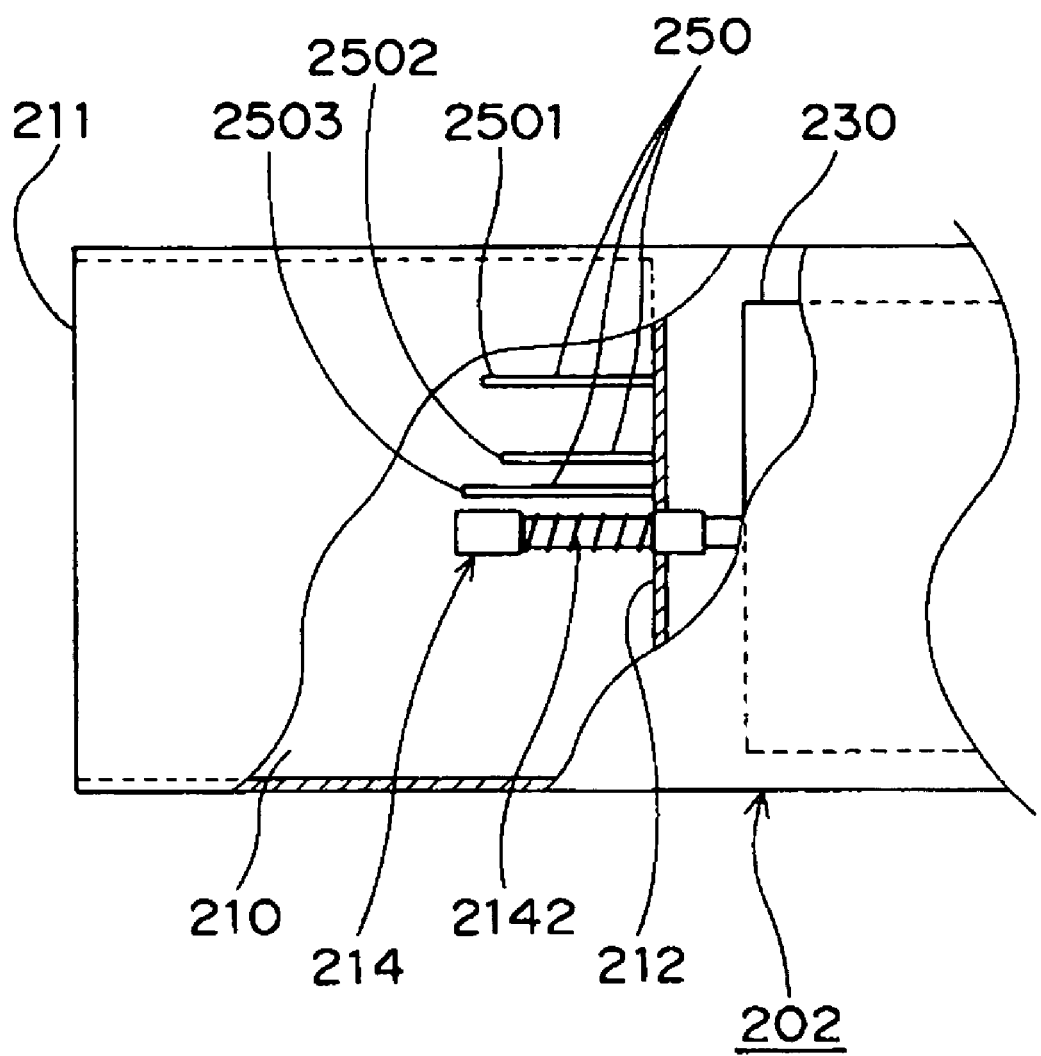
FIG. 6 is a view showing a structure in a modified example of the fuel cell main body shown in FIG. 3, the structure corresponding to the fuel tank for the fuel cell shown in FIG. 5.

The fuel cell main body 202 is provided with a valve opening and closing member 250 in place of the valve opening and closing member 213 provided in the fuel cell main body 201 mentioned above, as shown in FIG. 6. The other structures in the fuel cell main body 202 are not different from the fuel cell main body 201. In this case, in order to avoid any confusion, it is called as a second valve opening and closing member 250. The second valve opening and closing member 250 is constituted by three rod-like members having different lengths and protruded from the bottom surface 212 of the tank accommodating portion 210 in the fuel cell main body 201, in the present embodiment. The respective lengths are set in correspondence to the concave portions 1511a and 1511b and the convex portion 1511c of the contact portion 1511 of the handle operating member 151 in the fuel tank 102 for the fuel cell as mentioned above. In the present embodiment, a second valve opening and closing member 2501 corresponds to the concave portion 1511a, a second valve opening and closing member 2502 corresponds to the convex portion 1511c, a second valve opening and closing member 2503 corresponds to the concave portion 1511b, and each of the members has a length moving the handle operating member 151 in the direction of the arrow 153.

In this case, the number and the length of the second valve opening and closing member 250 are not limited to the configuration mentioned above as far as it is possible to achieve the object of moving the handle operating member 151 in the direction of the arrow 153, but can be appropriately changed. Further, the size and the shape of the concave portion and the convex portion of the handle operating member 151 are changed in correspondence thereto. Further, it is not necessary that the number of the second opening and closing member 250 coincides with the number of the concave portion and the convex portion of the handle operating member 151 as far as it is possible to achieve the object mentioned above. In other words, it is possible to employ various modified examples which can be derived by those skilled in the art.

In the fuel tank 102 for the fuel cell and the fuel cell main body 202 structured as mentioned above, a description will be given of an operation of filling the fuel from the fuel tank 102 for the fuel cell to the fuel cell main body 202 with reference to FIGS. 8a to 8c. In this case, a description of the same operation as the fuel filling operation described with reference to FIGS. 4a to 4d will not be repeated. Further, in FIGS. 8a to 8c, a main portion relating to the fuel injecting portion 130 and the fuel supply portion 214 is illustrated.

Figure 8A:
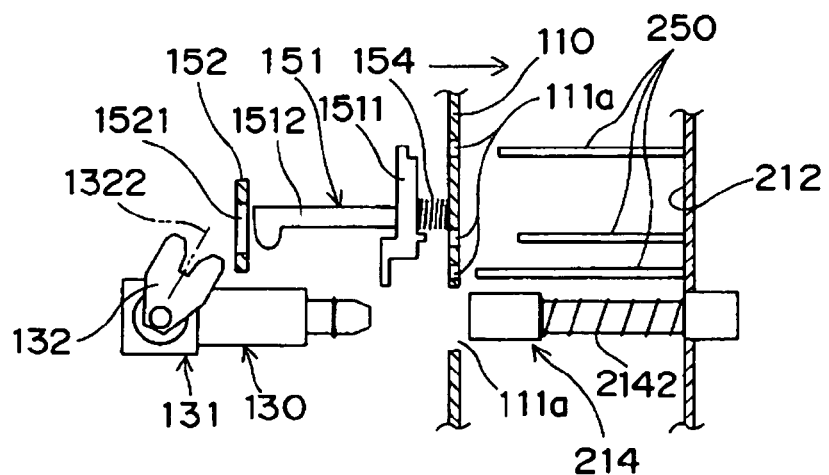
FIG. 8a is a view for explaining a state in which the fuel tank for the fuel cell and the fuel cell main body shown in FIG. 7 are joined.
Figure 8B:
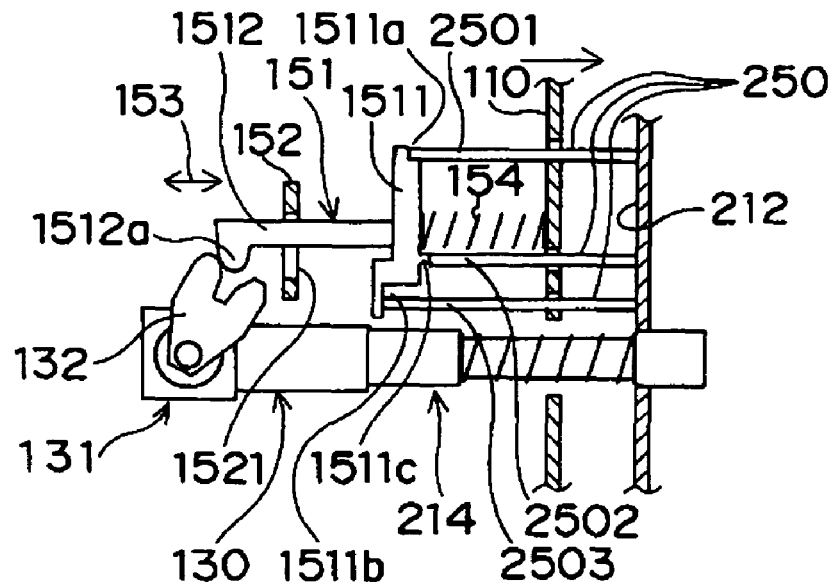
FIG. 8b is a view for explaining a state in which the fuel tank for the fuel cell and the fuel cell main body shown in FIG. 7 are joined.

After opening the shutter 140 of the fuel tank 102 for the fuel cell, the fuel tank 102 for the fuel cell is orientated so as to be inserted to the tank accommodating portion 210 of the fuel cell main body 202, as shown in FIG. 8a. In accordance that the fuel tank 102 for the fuel cell moves forward within the tank accommodating portion 210, the second valve opening and closing member 250 and the fuel supply portion 214 pass through the opening portion 111a of the fuel tank 102 for the fuel cell. Further, the second valve opening and closing member 2501 is brought into contact with the concave portion 1511a of the contact portion 1511 of the handle operating member 151, the second valve opening and closing member 2502 is brought into contact with the convex portion 1511c of the contact portion 1511, and the second opening and closing member 2503 is brought into contact with the concave portion 1511b of the contact portion 1511. Further, in accordance that the fuel tank 102 for the fuel cell moves forward within the tank accommodating portion 210, the handle operating member 151 moves in the direction of the arrow 153 against the energizing force of the spring 154 by being pressed by the second valve opening and closing member 250. Accordingly, the operating portion 1512 of the second valve opening and closing member 250 passes through the opening 1521 of the improper operation preventing member 152, and the protruding portion 1512a of the operating portion 1512 is brought into contact and engaged with the concave portion 1324 of the handle 132 of the fuel valve 131 in the fuel tank 102 for the fuel cell. In this case, the handle 132 is positioned at the closed position 1322 at this time. Further, when the handle operating member 151 is brought into contact with the handle 132, the fuel injecting portion 130 of the fuel tank 102 for the fuel cell and the fuel supply portion 214 of the fuel cell main body 202 are already joined as illustrated, and the closing valves 139 and 2141 in both elements are in an open state as shown in FIG. 12.

Further, in accordance that the fuel tank 102 for the fuel cell moves forward within the tank accommodating portion 210, the handle operating member 151 is pushed by the second valve opening and closing member 250, and moves further in the direction of the arrow 153. Accordingly, the valve opening and closing member 213 in which the protruding portion 1512a is engaged with the concave portion 1324 of the handle 132 rotates the handle 132 from the closed position 1322 to the opened position 1323 side.

Figure 8C:
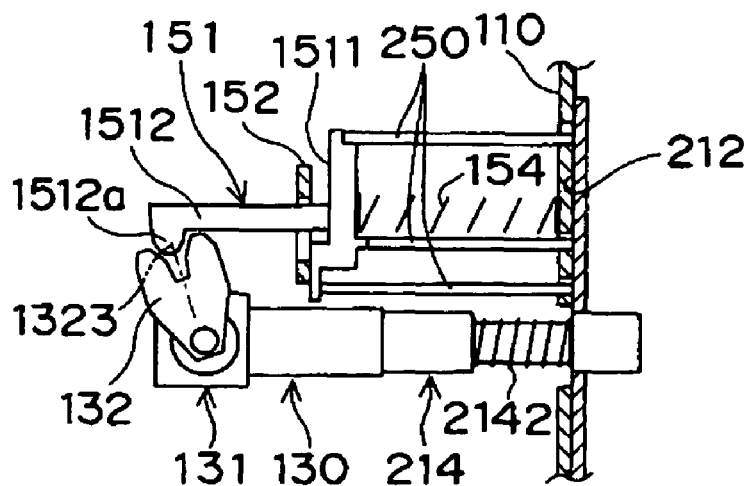
FIG. 8c is a view for explaining a state in which the fuel tank for the fuel cell and the fuel cell main body shown in FIG. 7 are joined.

Further, as shown in FIG. 8c, when the opening portion 111a of the fuel tank 102 for the fuel cell reaches the bottom surface 212 of the tank accommodating portion 210 of the fuel cell main body 202, the handle operating member 151 pushed by the second valve opening and closing member 250 further rotates the handle 132 so as to position at the opened position 1323.

Accordingly, the flow path for the liquid fuel in the fuel valve 131 in the fuel tank 102 for the fuel cell is opened, and the methanol water solution 109 within the tank portion 120 of the fuel tank 102 for the fuel cell can be supplied to the power generation auxiliary portion 230 of the fuel cell main body 202 while passing through the fuel injecting portion 130 and the fuel supply portion 214.

The description mentioned above is given of the case that the fuel tank 102 for the fuel cell suitable for the fuel cell main body 202 is loaded to the fuel cell main body 202. On the other hand, a description will be given of a case of inserting the fuel tank 102 for the fuel cell having the handle operating member 151 which does not comply with the second valve opening and closing member of the fuel cell main body 202 to the fuel cell main body 202, with reference to FIG. 9.

Figure 9:
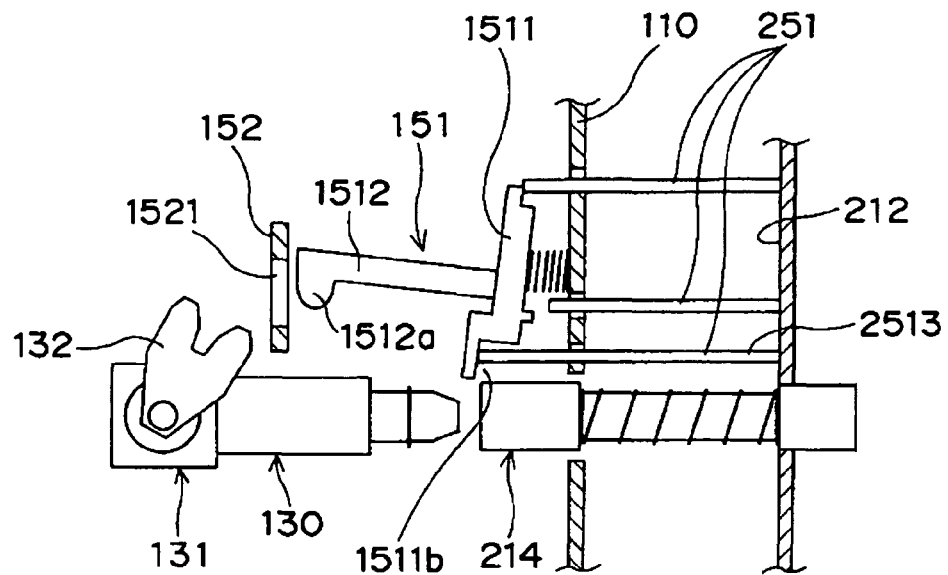
FIG. 9 is a view showing a state of intending to install an improper fuel tank for the fuel cell to the fuel cell main body, in the structures of the fuel tank for the fuel cell and the fuel cell main body shown in FIGS. 5 and 6.

In the second valve opening and closing member 251 of the fuel cell main body 202 shown in FIG. 9, there is provided a second valve opening and closing member 2513 which is longer than the second valve opening and closing member 2503 mentioned above. In the case of having the second valve opening and closing member 2513 mentioned above, since it does not coincides with the depth in the concave portion 1511b of the contact portion 1511 of the handle operating member 151, the handle operating member 151 does not move in the direction of the arrow 153 in accordance with the inserting operation mentioned above, but is sloped as illustrated. Accordingly, the operating portion 1512 of the handle operating member 151 interferes with the improper operation preventing member 152, and can not pass through the opening 1521 of the improper operation preventing member 152. Therefore, the liquid fuel flow path in the fuel valve 131 of the fuel tank 102 for the fuel cell is not opened and the fuel can not be supplied.

After supplying the fuel, the lock is disengaged as mentioned above, and the fuel tank 102 for the fuel cell is disconnected from the fuel cell main body 202. At this time, the relation of operation between the handle operating member 151 and the handle 132 is changed inversely to that mentioned above, that is, so as to go from FIG. 8c to 8a. Briefly describing, the handle 132 positioned at the opened position 1323 is positioned at the closed position 1322 by the handle operating member 151 engaging with the concave portion 1324 of the handle 132 in the order of FIG. 8c and FIG. 8b in accordance with the disconnecting operation. Further, after the handle 132 is positioned at the closed position 1322, the fuel injecting portion 130 and the fuel supply portion 214 are disconnected. In this case, on the basis of the disconnection between the fuel injecting portion 130 and the fuel supply portion 214, the closing valves 139 and 2141 in both the elements become in the closed state corresponding to the original state, as shown in FIGS. 10 and 11.

As described above, in the same manner as the case of the fuel cell system 301, since the fuel valve 131 is properly opened and closed at a time when the fuel cell main body 202 and the fuel tank 102 for the fuel cell are attached and detached even in the fuel cell system 302, the methanol water solution 109 of the liquid fuel does not leak out from the fuel tank 102 for the fuel cell at the attaching and detaching time mentioned above. Accordingly, it is possible to improve the safety in the fuel supply in comparison with the conventional structure. Further, since the handle operating member 151 is provided in the fuel tank 102 for the fuel cell, it is impossible to open the fuel valve 131 of the fuel tank 102 for the fuel cell until the handle operating member 151 is pressed along the direction of the arrow 153, for example, even if the handle operating member 151 is pressed through the opening portion 111a of the fuel tank 102 for the fuel cell. Therefore, the safety is further improved in comparison with the case of the fuel cell system 301.

Third Embodiment

Further, a description will be given of a third embodiment corresponding to a modified example of the fuel cell system 301 mentioned above.

As shown in FIG. 16, a fuel cell system 303 corresponding to one of the third embodiment mentioned above comprises a fuel tank 103 for a fuel cell corresponding to a modified example of the fuel tank 101 for the fuel cell mentioned above, and a fuel cell main body 203 corresponding to a modified example of the fuel cell main body 201 mentioned above. In this case, the same reference numerals are attached to the same constituting portions as those of the embodiment mentioned above, and a description thereof will not be repeated.

Figure 17:
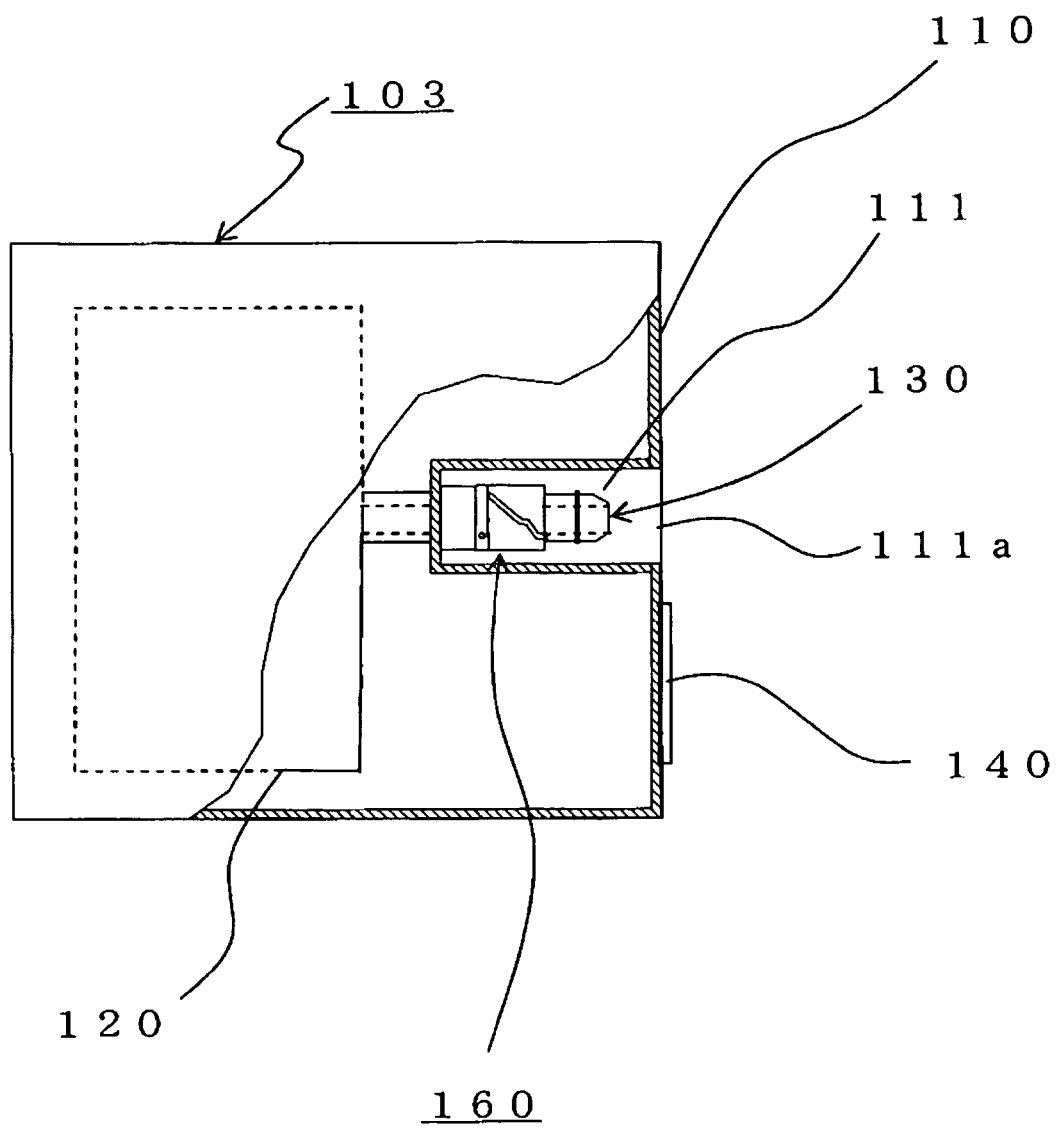
FIG. 17 is a view showing a structure of a fuel tank for a fuel cell provided in a fuel cell system shown in FIG. 16.

The fuel bank 103 for the fuel cell is provided with a fuel valve 160 functioning as a flow path opening and closing member in place of the fuel valve 131 in the fuel tank 101 for the fuel cell mentioned above, as shown in FIG. 17. The other structures in the fuel tank 103 for the fuel cell are not different from those of the fuel tank 101 for the fuel cell. In this case, in order to avoid any confusion, the fuel valve 160 is called as the second fuel valve 160 here.

The second fuel valve 160 has a non-rotating engagement portion 161 and a valve portion 162 rotating so as to open and close a liquid fluid flow path in the second fuel valve 160. The engagement portion 161 is fixed to the fuel injecting portion 130, and three members 1611 for engagement are formed approximately spirally in a peripheral surface of the engagement portion 161 in the present embodiment. A connection member mentioned below included in the fuel cell main body 203 is engaged with the member 1611 for engagement. In this case, the member 1611 for engagement is formed in a groove shape in the present embodiment, however, may be formed in a convex shape or a concave shape. The valve portion 162 is provided with a member 1621 for rotation in a protruding manner at one position in a peripheral surface thereof. The member 1621 for rotation is engaged with a member for rotating the valve mentioned below included in the fuel cell main body 203. In this case, the member 1621 for rotation is a member corresponding to one example of the handle 132 of the fuel valve 131 in each of the fuel cell systems 301 and 302 mentioned above.

Figure 18:
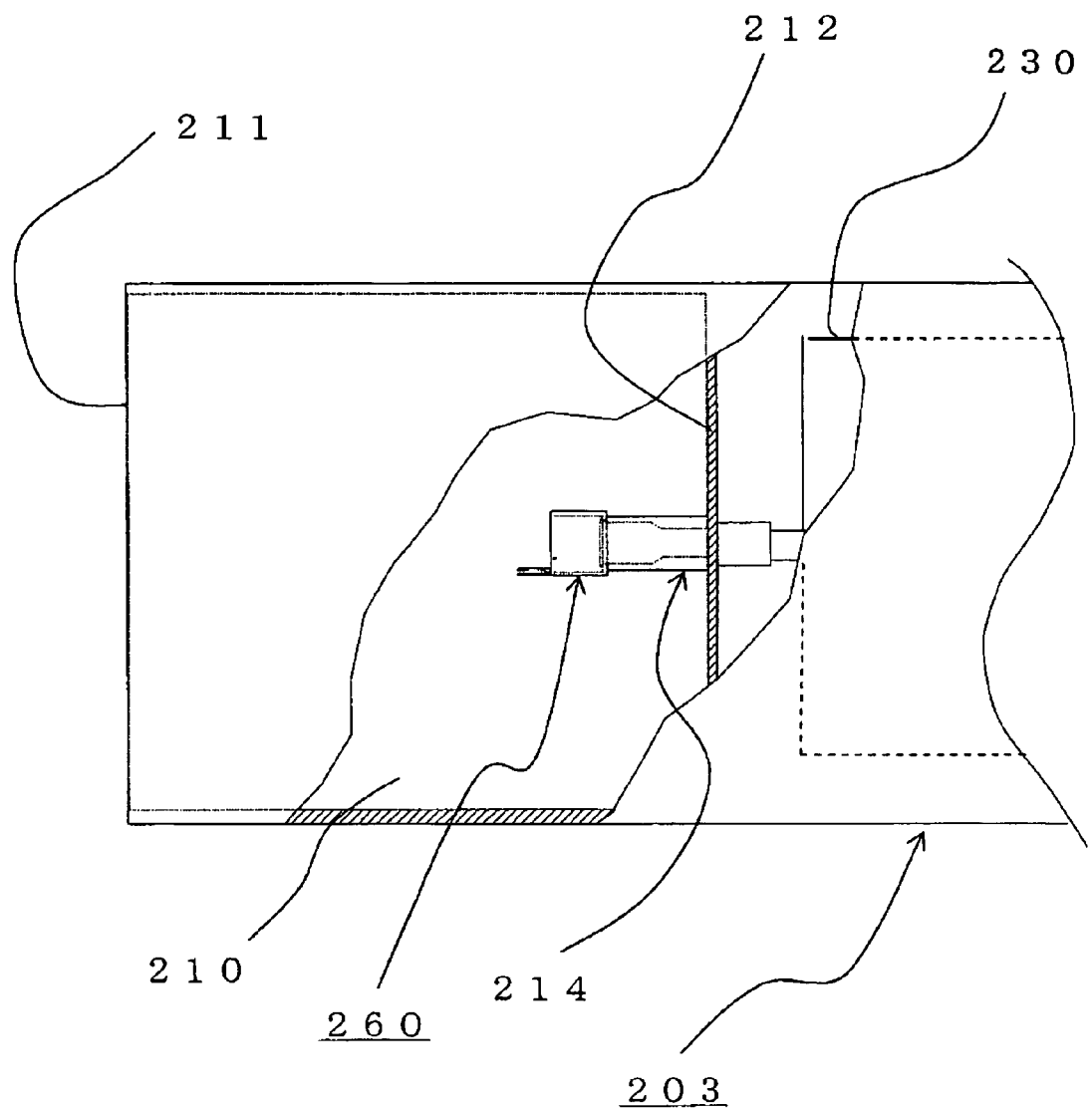
FIG. 18 is a view showing a structure of a fuel cell main body provided in the fuel cell system shown in FIG. 16.
Figure 19:
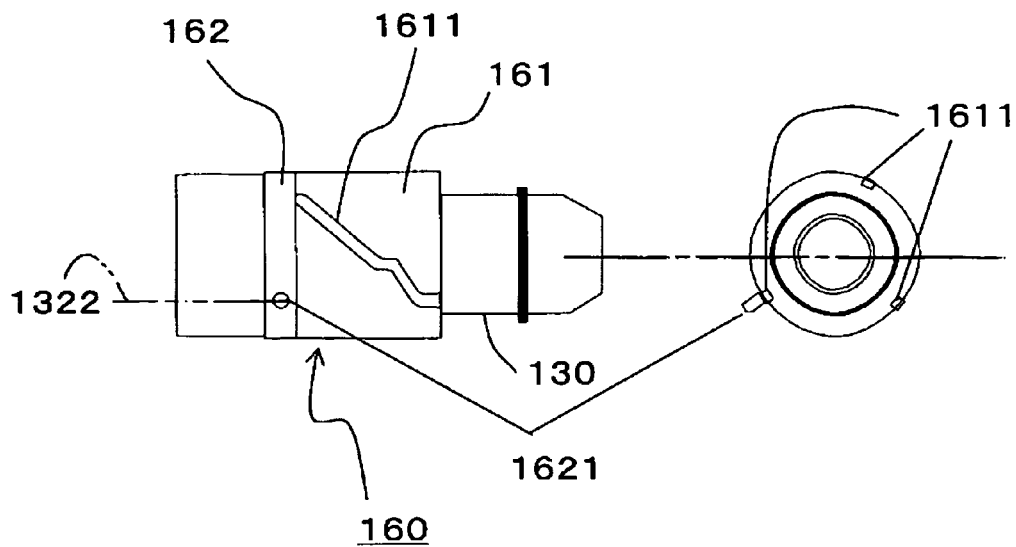
FIG. 19 is a view showing a structure of a fuel injecting portion of the fuel tank for the fuel cell shown in FIG. 17.

The fuel cell main body 203 comprises an opening and closing mechanism 260 for opening and closing the second fuel valve 160 at a leading end portion of the fuel supply portion 214 in the fuel cell main body 201, as shown in FIG. 18. The other structures in the fuel cell main body 203 are not different from the fuel cell main body 201. In this case, the opening and closing mechanism 260 mentioned above corresponds to one example of the member for opening and closing the valve in the fuel cell systems 301 and 302 mentioned above.

Figure 20:
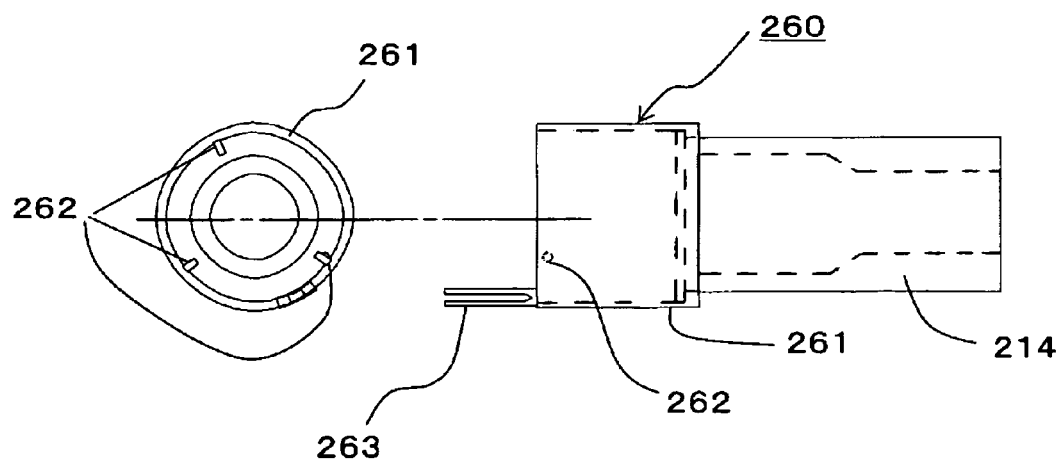
FIG. 20 is a view showing a structure of a fuel supply portion of the fuel cell main body shown in FIG. 18.

The opening and closing mechanism 260 has a ring member 261, a connection member 262 and a valve rotating member 263, as shown in FIG. 20. The ring member 261 is rotatably installed with respect to a leading end portion of the fuel supply portion 214, and the fuel injecting portion 130 of the fuel tank 103 for the fuel cell can be inserted thereto. The ring member 261 is energized by an appropriate energizing means in such a manner as to arrange the connection member 262 at the initial position at a time when the ring member 261 is not engaged with the fuel injecting portion 130. In this case, the initial position corresponds to a position at which the connection member 262 can be engaged with the member 1611 for engagement in the second fuel valve 160 of the fuel tank 103 for the fuel cell at a time when the fuel tank 103 for the fuel cell is inserted to the fuel cell main body 203. The connection member 262 corresponds to a pin-shaped member protruding to a center side along a diametrical direction in an inner peripheral surface of the ring member 261, and is provided at three positions in the present embodiment in correspondence to the member 1611 for engagement of the fuel tank 103 for the fuel cell. The valve rotating member 263 corresponds to a member which is protruded from a leading end of the ring member 261, has a fork shape as illustrated, and is engaged with the member 1621 for rotation in the second fuel valve 160 of the fuel tank 103 for the fuel cell when the fuel tank 103 for the fuel cell is inserted to the fuel cell main body 203.

In the fuel tank 103 for the fuel cell and the fuel cell main body 203 structured as mentioned above, a description will be given of an operation of filling the fuel from the fuel tank 103 for the fuel cell to the fuel cell main body 203 with reference to FIGS. 21a to 21d. In this case, a description of the same operation as the fuel filling operation described with reference to FIGS. 4a to 4d will not be repeated. Further, in FIGS. 21a to 21d, only a main portion relating to the fuel injecting portion 130 and the fuel supply portion 214 is illustrated.

Figure 21A:
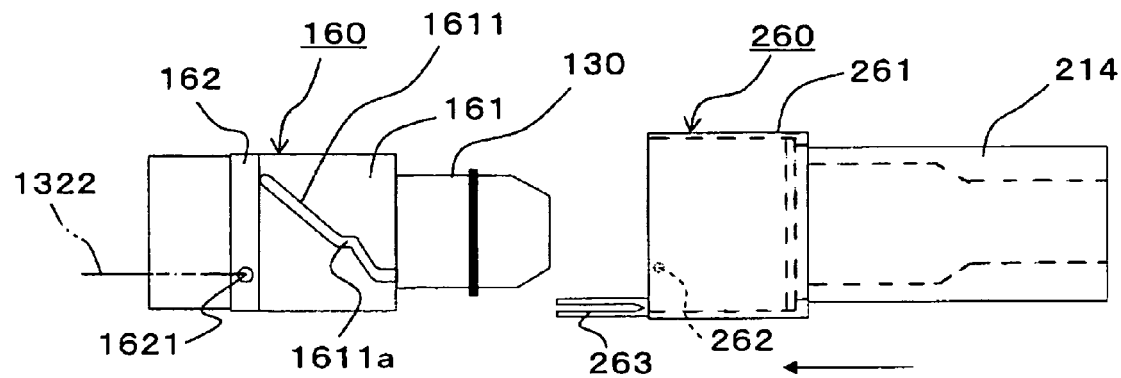
FIG. 21a is a view for explaining a state in which the fuel injecting portion and the fuel supply portion shown in FIGS. 19 and 20 are joined.
Figure 21B:
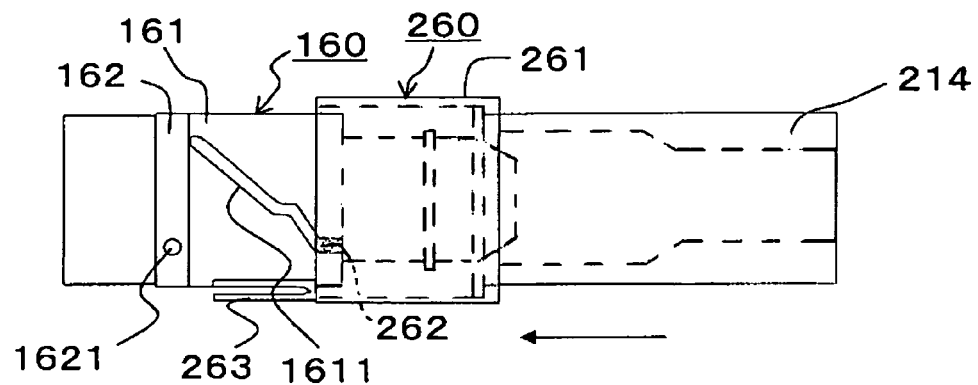
FIG. 21b is a view for explaining a state in which the fuel injecting portion and the fuel supply portion shown in FIGS. 19 and 20 are joined.

After opening the shutter 140 of the fuel tank 103 for the fuel cell, the fuel tank 103 for the fuel cell is orientated so as to be inserted to the tank accommodating portion 210 in such a manner that the opening portion 111a of the concave portion 111 in the fuel tank 103 for the fuel cell faces to the bottom surface 212 of the tank accommodating portion 210 of the fuel cell main body 203, as shown in FIG. 21a. In accordance that the fuel tank 103 for the fuel cell moves forward within the tank accommodating portion 210, the fuel supply portion 214 having the opening and closing mechanism 260 passes through the opening portion 111a of the fuel tank 103 for the fuel cell, and the ring member 261 of the opening and closing mechanism 260 is inserted to the fuel injecting portion 130 of the fuel tank 103 for the fuel cell. At this time, the connection member 262 in the opening and closing mechanism 260 is engaged with the member 1611 for engagement of the second fuel valve 160. Further, at this time, the closing valves 139 and 2141 in the fuel injecting portion 130 and the fuel supply portion 214 become in an opened state as shown in FIG. 12, however, the second fuel valve 160 is yet in a closed state and is positioned at a closed position 1322. A piping connected to the closing valve 2141 is structured such as to be freely expanded and contracted, for example, by an energizing force of the spring (not shown), and is fixed at a position joined with the closing valve 139, however, an outer piping of the fuel supply portion 214 supporting the opening and closing mechanism 260 is inserted in accordance with the movement of the fuel tank 103 for the fuel cell.

Figure 21C:
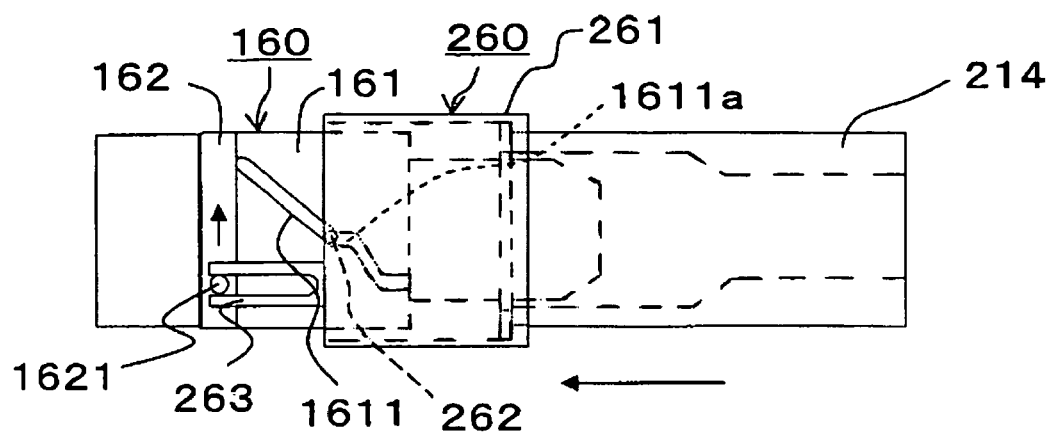
FIG. 21c is a view for explaining a state in which the fuel injecting portion and the fuel supply portion shown in FIGS. 19 and 20 are joined.

Further, in accordance that the fuel tank 103 for the fuel cell moves forward within the tank accommodating portion 210, the connection member 262 engaged with the member 1611 for engagement moves in accordance with the member 1611 for engagement. In accordance with the movement, the ring member 261 of the opening and closing mechanism 260 having the connection member 262 starts rotating. Further, in accordance with the forward movement mentioned above, the connection member 262 engaged with the member 1611 for engagement reaches a straight line portion 1611a extending in an axial direction of the fuel injecting portion 130. At the reaching time point, the valve rotating member 263 in the opening and closing mechanism 260 is arranged in such a manner as to correspond to the member 1621 for rotation in the second fuel valve 160. Therefore, in accordance that the fuel tank 103 for the fuel cell further moves forward within the tank accommodating portion 210, the connection member 262 moves in the axial direction along the straight line portion 1611a of the member 1611 for engagement, whereby the valve rotating member 263 and the member 1621 for rotation are engaged as shown in FIG. 21c.

When the fuel tank 103 for the fuel cell moves forward within the tank accommodating portion 210, the connection member 262 moves forward in accordance with the member 1611 for engagement and further rotates the ring member 261. In other words, it rotates the valve portion 162 from the closed position 1322 to the opened position 1323 side via the member 1621 for rotation engaging with the valve rotating member 263.

Figure 21D:
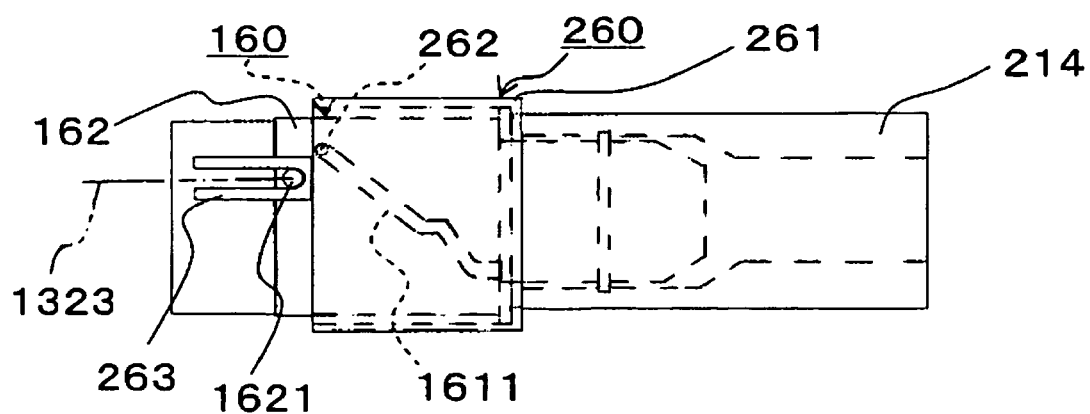
FIG. 21d is a view for explaining a state in which the fuel injecting portion and the fuel supply portion shown in FIGS. 19 and 20 are joined.

Further, as shown in FIG. 21d, when the connection member 262 reaches a terminal end portion of the member 1611 for engagement, that is, when the opening portion 111a of the fuel tank 103 for the fuel cell reaches the bottom surface 212 of the tank accommodating portion 210 of the fuel cell main body 203, the valve portion 162 is positioned at the opened position 1323 via the member 1621 for rotation.

As mentioned above, the flow path for the liquid fuel of the second fuel valve 160 in the fuel tank 103 for the fuel cell is opened, and the methanol water solution 109 within the tank portion 120 of the fuel tank 103 for the fuel cell can be supplied to the power generation auxiliary portion 230 of the fuel cell main body 203 through the fuel injecting portion 130 and the fuel supply portion 214.

After supplying the fuel, the lock is disengaged as mentioned above, and the fuel tank 103 for the fuel cell is disconnected from the fuel cell main body 203. At this time, the relation of operation between the second fuel valve 160 and the opening and closing mechanism 260 is changed inversely to that mentioned above, that is, in such a manner as to go from FIG. 21d to FIG. 21a. Briefly describing, the valve portion 162 of the second fuel valve 160 positioned at the opened position 1323 is positioned at the closed position 1322 on the basis of the rotation of the valve rotating member 263 of the opening and closing mechanism 260 which is engaged with the member 1621 for rotation of the second fuel valve 160, in the order of FIG. 21d and FIG. 21c, in accordance with the disconnecting operation mentioned above. Further, after the valve portion 162 is positioned at the closed position 1322, the fuel injecting portion 130 and the fuel supply portion 214 are disconnected. In this case, since the fuel injecting portion 130 and the fuel supply portion 214 are disconnected, the closing valves 139 and 2141 in both elements become in the closed state corresponding to the original state, as shown in FIGS. 10 and 11.

As described above, in the fuel cell system 303, in the same manner as the case of the fuel cell system 301, when the fuel cell main body 203 and the fuel tank 103 for the fuel cell are attached and detached, the second fuel valve 160 is properly opened and closed. Accordingly, the methanol water solution 109 does not leak out from the fuel tank 103 for the fuel cell at a time of attaching and detaching mentioned above. Therefore, it is possible to improve the safety in the fuel supply in comparison with the conventional structure. Further, in the fuel cell system 303, since the fuel injecting portion 130 and the fuel supply portion 214 have the second fuel valve 160 and the opening and closing mechanism 260, a number of the parts can be reduced in comparison with each of the fuel cell systems 301 and 302, and it is possible to achieve a compact structure. Further, when the fuel tank 103 for the fuel cell is stored as a single substance, the member 1621 for rotation in the second fuel valve 160 exists in an inner side of the outer surface of the fuel tank 103 for the fuel cell. Accordingly, even if it is intended to open the second fuel valve 160 by a rod-like member from the outer portion of the fuel tank 103 for the fuel cell, it is impossible to easily open the second fuel valve 160. As mentioned above, a more excellent safety can be obtained.

Fourth Embodiment

Further, a description will be given of a fourth embodiment corresponding to a modified example of the fuel cell system 301 mentioned above.

Figure 22:
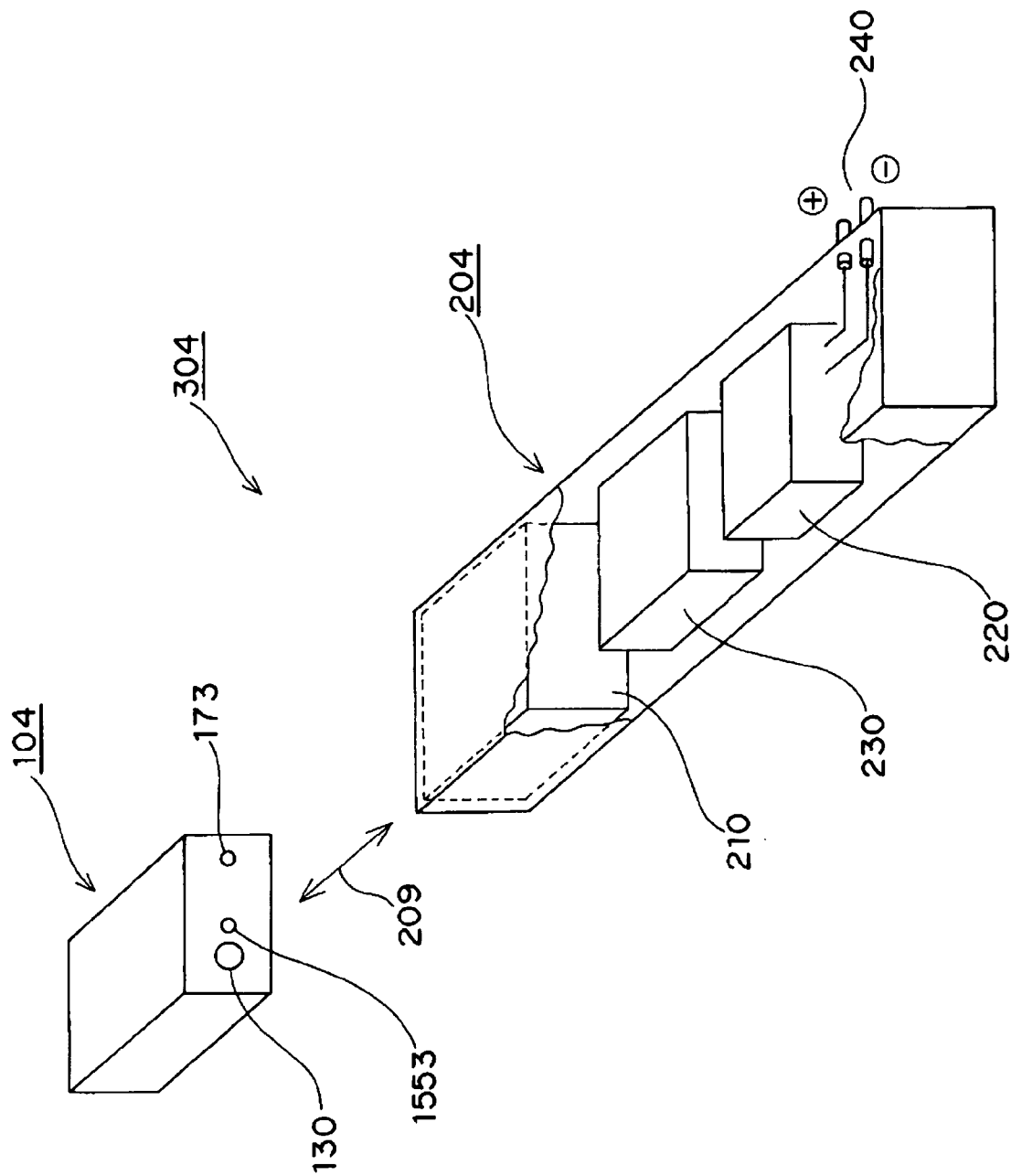
FIG. 22 is a perspective view showing a fuel cell system in accordance with a fourth embodiment of the present invention.

As shown in FIG. 22, a fuel cell system 304 corresponding to one of the fourth embodiment mentioned above comprises a fuel tank 104 for a fuel cell corresponding to a modified example of the fuel tank 101 for the fuel cell mentioned above, and a fuel cell main body 204 corresponding to a modified example of the fuel cell main body 201 mentioned above. In this case, the same reference numerals are attached to the same constituting portions having the same or similar functions to those of the constituting portions in the embodiment mentioned above, and a description thereof will not be repeated.

Figure 23:
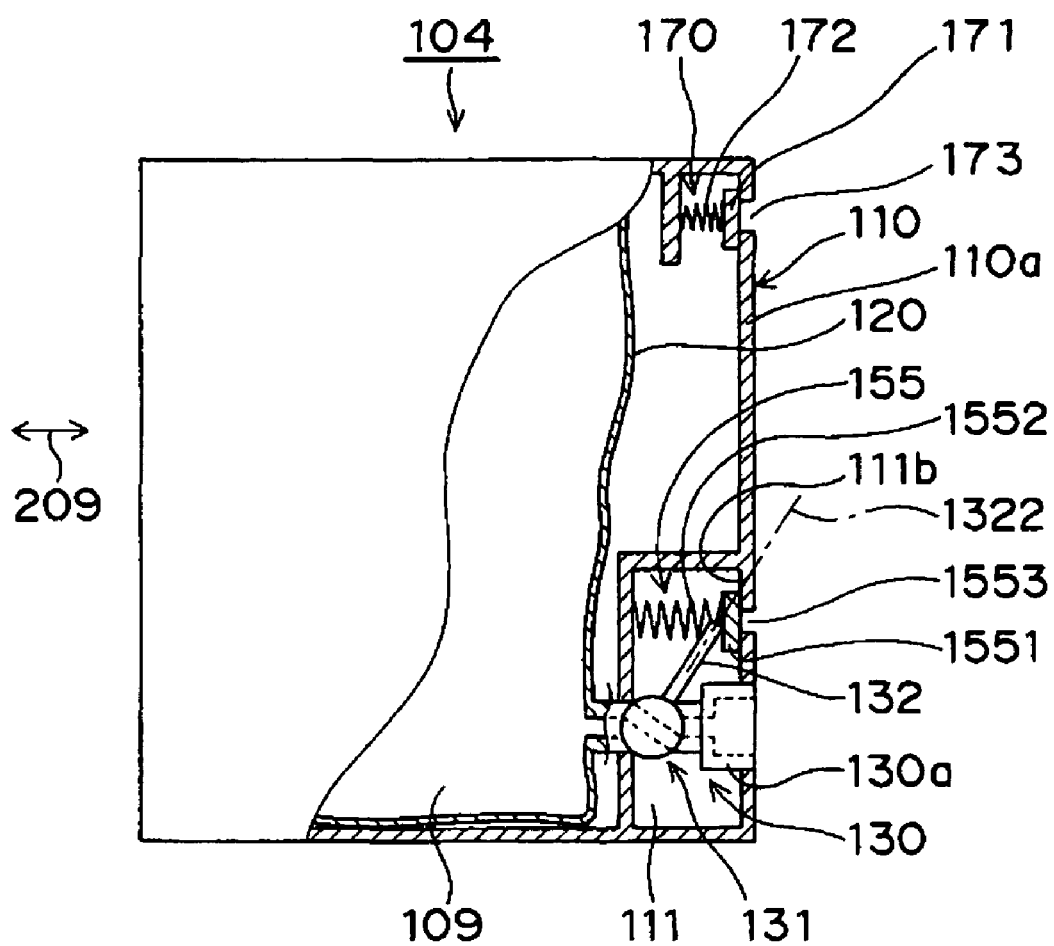
FIG. 23 is a view showing a structure of a fuel tank for a fuel cell provided in the fuel cell system shown in FIG. 22.

The fuel tank 104 for the fuel cell mentioned above is structured such that a sealing and airtightness within the casing 110 is more improved in comparison with the fuel tanks 101 to 103 for the fuel cell in the fuel cell systems 301 to 303 mentioned above. The fuel tank 104 for the fuel cell mentioned above has the casing 110, the tank portion 120, the fuel valve 131 arranged within the concave portion 111 and having the handle 132, a handle operating mechanism 155 provided at a position capable of operating the handle 132 within the concave portion 111, and an air pressure balancing portion 170 provided in a wall portion of the casing 110 in an outer side of the concave portion 111 within the casing 110, as shown in FIG. 23. In this case, the handle operating mechanism 155 is described as a second handle operating mechanism 155 in the following description about the present fourth embodiment for avoiding any confusion with the handle operating mechanism 150 in the second embodiment.

As mentioned above, in the fuel tank 104 for the fuel cell, in order to improve an airtightness within the casing 110, a leading end portion 130a of the fuel injecting portion 130 having the closing valve 139 is integrally structured with the casing 110 as shown in FIG. 23, for example, in place of the aspect that the leading end portion is positioned in an inner side of the concave portion 111 without being brought into contact with the casing 110 as shown in FIG. 1. Further, in order to achieve the above structure, an outer shape of the fuel injecting portion 130 is different from the cases of the fuel tank 101 for the fuel cell and the like, however, a function thereof is the same. Further, on the basis of the structure mentioned above, no shutter 140 is provided in the fuel tank 104 for the fuel cell. Further, an inner side of the concave portion 111 in which the fuel valve 131 is arranged is in an airtight state with respect to the inner side of the casing 110 where the tank portion 120 exists.

The second handle operating mechanism 155 has a handle operating member 1551, a spring 1552 and an opening 1553, and does not have the improper operation preventing member 152 in the second embodiment, in the present embodiment. The handle operating member 1551 is a member which is coupled to a leading end of the handle 132 in a movable manner, is pressed by a valve opening and closing member 216 projected from the bottom surface 212 of the tank accommodating portion 210 of the fuel cell main body 204, and can reciprocate within the concave portion 111 along an attaching and detaching direction 209. The spring 1552 is a member corresponding to an example of an energizing member for energizing the handle operating member 1551 in such a manner as to position the handle 132 coupled to the handle operating member 1551 at the closed position 1322, in an unloaded state in which the fuel tank 104 for the fuel cell is not loaded to the tank accommodating portion 210 of the fuel cell main body 204. Further, when the handle operating member 1551 is brought into contact with the side wall 110a of the casing 110 on the basis of the energizing force of the spring 1552, the handle 132 is positioned at the closed position 1322. The opening 1553 is provided in the side wall 110a of the casing 110 facing to the bottom surface 212 of the tank accommodating portion 210, and is opened and closed by the handle operating member 1551 energized by the spring 1552. Further, the opening 1553 is arranged in correspondence to the valve opening and closing member 216, and is formed at such a dimension that the valve opening and closing member 216 can move forward and backward, in such a manner as to press the handle operating member 1551. In this case, the attaching and detaching direction 209 mentioned above corresponds to a direction in which the fuel tank 104 for the fuel cell is attached to and detached from the tank accommodating portion 210 of the fuel cell main body 204.

In this case, the structure of the second handle operating mechanism 155 is not limited to an illustrated structure, but can employ any other structures which can achieve the function mentioned above and can be easily derived by those skilled in the art.

The air pressure balancing portion 170 is a mechanism for balancing the air pressure within the casing 110 shielded from an external portion under a sealed state with an ambient air pressure, and has a closure plate 171, a spring 172 and an opening 173. The closure plate 171 is a member for closing the opening 173 formed in the side wall 110a in an airtight state. In this case, in order to achieve the airtight state, the closure plate 171 may be provided with an airtight member, for example, an O-ring or the like, or the closure plate 171 itself is made of an elastic material having a sealing performance such as a rubber material or the like. The spring 172 is a member corresponding to one example of the energizing member for energizing the closure plate 171 to the opening 173, in such a manner that the closure plate 171 closes the opening 173 in an airtight state at a time when the fuel tank 104 for the fuel cell is in the unloaded state. In this case, the structure of the air pressure balancing portion 170 is not limited to the illustrated structure, but can employ various structures which can achieve the function mentioned above and can be easily derived by those skilled in the art. For example, the closing valves as shown in FIGS. 10 and 11 can be employed.

Figure 24:
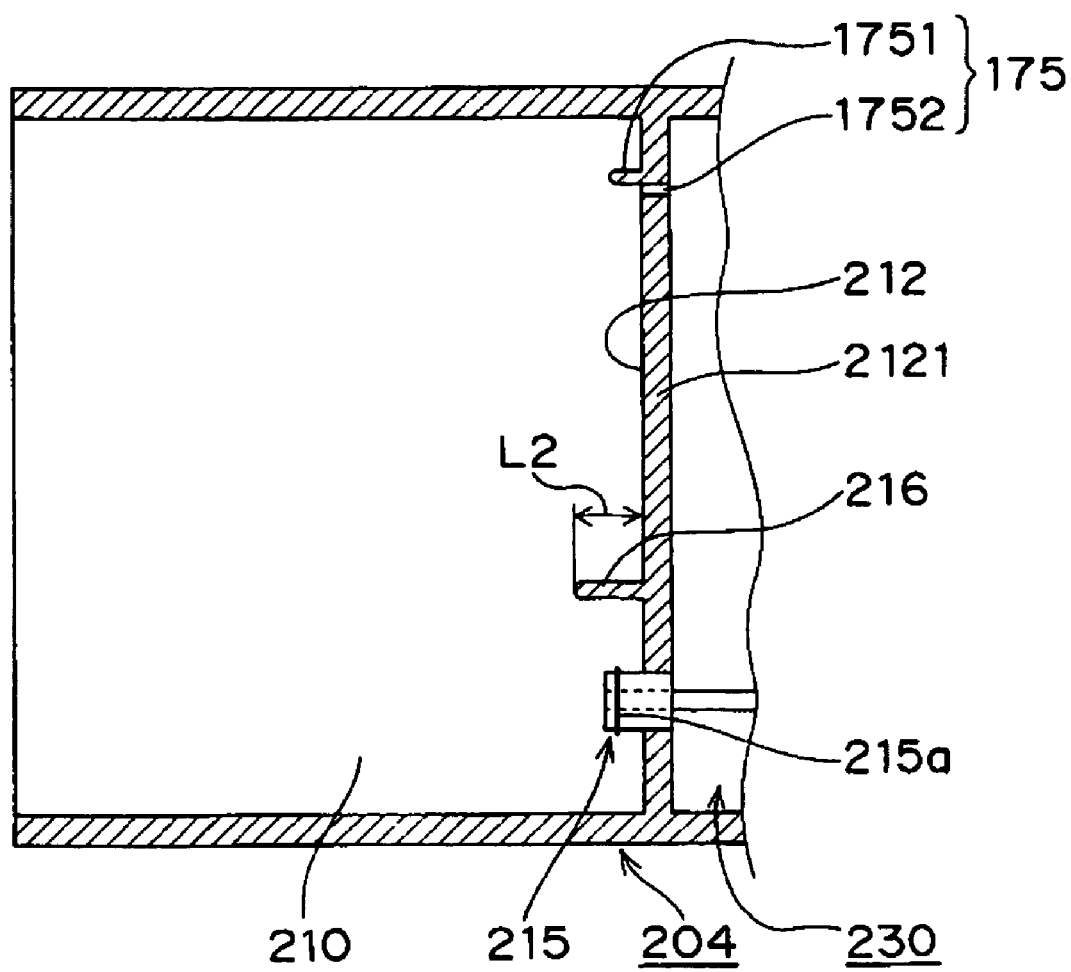
FIG. 24 is a view showing a structure of a fuel cell main body provided in the fuel cell system shown in FIG. 22.

Next, a description will be given of the fuel cell main body 204 with reference to FIG. 24. The tank accommodating portion 210 of the fuel cell main body 204 comprises a fuel supply portion 215, a valve opening and closing member 216 and an engagement mechanism 175 in correspondence to the fuel injecting portion 130, the opening 1553 and the opening 173 of the fuel tank 104 of the fuel cell.

Figure 25:
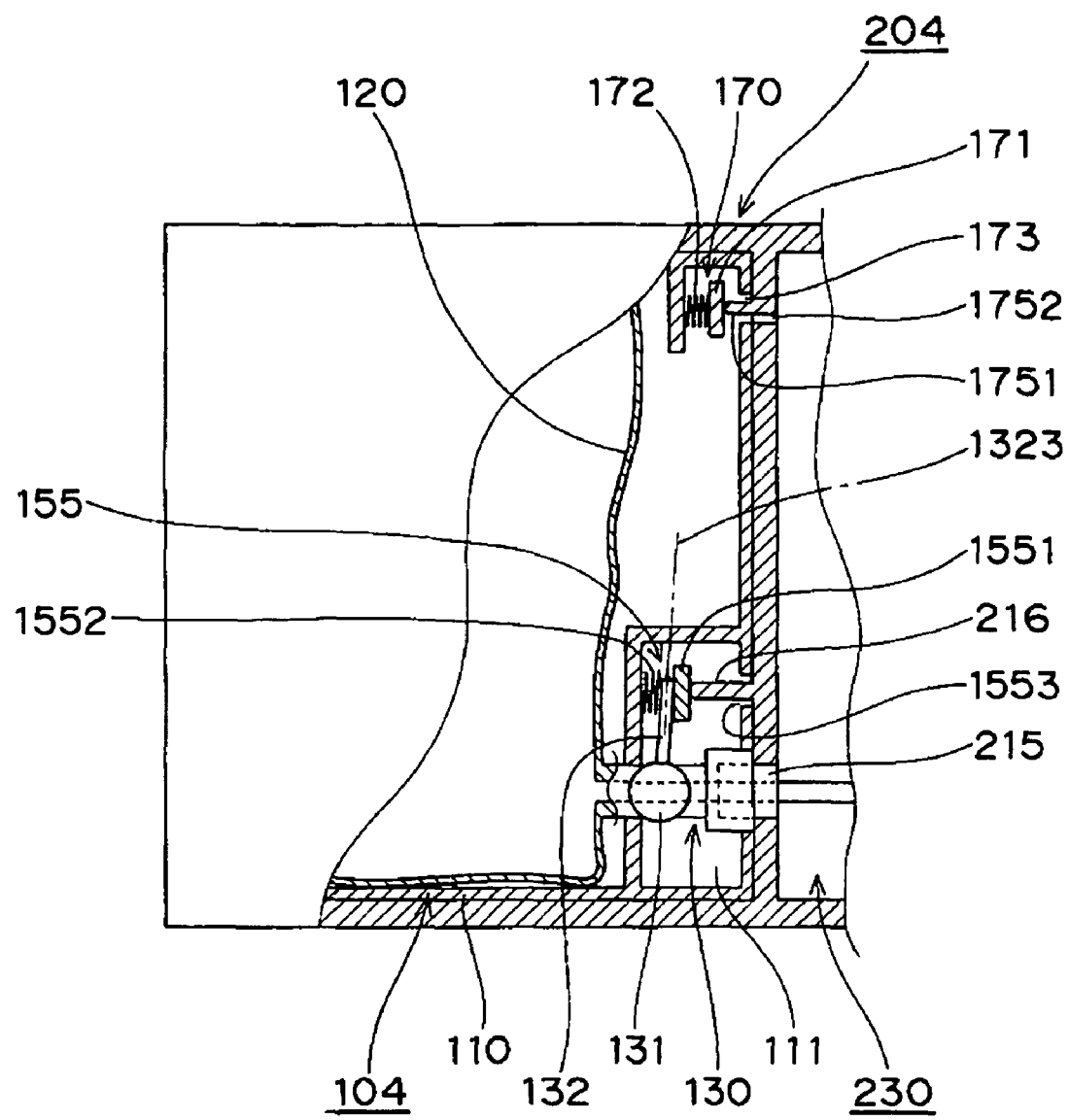
FIG. 25 is a view showing a state in which the fuel tank for the fuel cell shown in FIG. 23 and the fuel cell main body shown in FIG. 24 are joined.

The fuel supply portion 215 is a portion corresponding to the fuel supply portion 214 mentioned above, and is a portion engaging with the fuel injecting portion 130 so as to supply the methanol water solution 109 to the power generating mechanism portion 230 from the fuel tank 104 for the fuel cell, when the fuel tank 104 for the fuel cell is loaded to the tank accommodating portion 210, as shown in FIG. 25. In this case, the outer shape of the fuel supply portion 215 is different from the cases of the fuel cell main body 201 and the like in such a manner as to be engaged with the fuel injecting portion 130 of the fuel tank 104 for the fuel cell, however, the function thereof is the same. Further, the fuel supply portion 215 has the closing valve 2141, and the closing valve 2141 is brought into contact with the closing valve 139 so as to open the flow path when the fuel supply portion 215 and the fuel injecting portion 130 are engaged. In this case, in the same manner as the embodiments mentioned above, when the closing valve 2141 and the closing valve 139 open the flow path, the fuel valve 131 does not open the flow path yet. Further, there is provided with an O-ring 215a for preventing the liquid leakage at a time of being engaged with the fuel injecting portion 130.

The valve opening and closing member 216 is a rod-like member projected from the bottom surface 212 of the tank accommodating portion 210 along the attaching and detaching direction 209. As shown in FIG. 25, when the fuel tank 104 for the fuel cell is loaded to the tank accommodating portion 210, the valve opening and closing member 216 passes through the opening 1553, presses the handle operating member 1551 against the energizing fore of the spring 1552 in the second handle operating mechanism 155 of the fuel tank 104 for the fuel cell, and rotates the handle 132 from the closed position 1322 to the opened position 1323. Accordingly, the valve opening and closing member 216 has such a length L2 as to make the rotation mentioned above possible with respect to the handle 132.

The engaging mechanism 175 is a mechanism engaging with the air pressure balancing portion 170 so as to balance the air pressure between the inner and outer sides of the casing 110, and is constituted by a push-down member 1751 and an air hole 1752. The push-down member 1751 is a rod-shaped member projected from the bottom surface 212 of the tank accommodating portion 210 along the attaching and detaching direction 209. As shown in FIG. 25, when the fuel tank 104 for the fuel cell is loaded to the tank accommodating portion 210, the push-down member 1751 passes through the opening 173, and presses the closure plate 171 against the energizing fore of the spring 172 in the air pressure balancing portion 170 of the fuel tank 104 for the fuel cell. The air hole 1752 is positioned so as to be in adjacent to the push-down member 1751 and face to the opening 173, and passes through a partition wall 2121 between the tank accommodating portion 210 and the power generating mechanism portion 230. Accordingly, the air pressure within the casing 110 is balanced with the ambient air pressure through the opening 173 and the air hole 1752 on the basis of the pressing operation mentioned above.

In the fuel tank 104 for the fuel cell and the fuel cell main body 204 structured as mentioned above, a description will be given of an operation of filling the fuel from the fuel tank 104 for the fuel cell to the fuel cell main body 204. In this case, a description of the same operation as the fuel filling operation described in the embodiments mentioned above will not be repeated.

The fuel tank 104 for the fuel cell is oriented in such a manner that the fuel injecting portion 130 or the like in the fuel tank 103 for the fuel cell faces to the bottom portion 212 of the tank accommodating portion 210 of the fuel cell main body 204 so as to be inserted to the tank accommodating portion 210. In accordance that the fuel tank 104 for the fuel cell moves forward within the tank accommodating portion 210, the fuel injecting portion 130 and the fuel supply portion 215 are engaged, and the closing valve 139 and the closing valve 2141 are brought into contact with each other so as to open the flow path. Further, as well as the valve opening and closing member 216 pushes down the handle operating member 1551 through the opening 1553, and starts rotating the handle 132 of the fuel valve 131 from the closed position 1322 to the opened position 1323, the push-down member 1751 pushes down the closure plate 171 through the opening 173 and opens the inner side of the casing 110 to the external portion.

When the fuel tank 104 for the fuel cell further moves forward, and the fuel tank 104 for the fuel cell is completely brought into contact with the bottom surface 212, as shown in FIG. 25, the valve opening and closing member 216 further pushes down the handle operating member 1551, and positions the handle 132 of the fuel valve 131 at the opened position 1323. Accordingly, the flow path between the fuel injecting portion 130 and the fuel supply portion 215 is completely opened, and the fuel can be supplied. Further, the push-down of the closure plate 171 by the push-down member 1751 is maintained.

After supplying the fuel, the lock is disengaged as mentioned above, and the fuel tank 104 for the fuel cell is disconnected from the fuel cell main body 204. At this time, the handle operating member 1551 is moved to the side wall 110a side on the basis of the energizing force of the spring 1552 in correspondence to the retraction of the valve opening and closing member 216. In correspondence to the movement, the handle 132 of the fuel valve 131 is rotated from the opened position 1323 to the closed position 1322 side. Further, when the handle operating member 1551 is brought into contact with the side wall 110a, the handle 132 is positioned at the closed position 1322, and the flow path is closed. Further, in correspondence to the retraction of the push-down member 1751, the closure plate 171 is moved to the side wall 110a side on the basis of the energizing force of the spring 172, and the closure plate 171 is brought into contact with the side wall 110a. On the basis of the contact, the inner side of the casing 110 is sealed from the external portion. Thereafter, since the fuel injecting portion 130 and the fuel supply portion 214 are disconnected, the closing valves 139 and 2141 in both elements become in the closed state corresponding to the original state as shown in FIGS. 10 and 11.

As mentioned above, in the fuel cell system 304, in the same manner as the case of the fuel cell system 301, since the fuel valve 131 is properly opened and closed at a time when the fuel cell main body 204 and the fuel tank 104 for the fuel cell are attached and detached, the methanol water solution 109 of the liquid fuel does not leak out from the fuel tank 104 for the fuel cell at the attaching and detaching time mentioned above. Accordingly, it is possible to improve the safety in the fuel supply in comparison with the conventional structure. Further, since the airtightness within the casing 110 is improved in the fuel tank 104 for the fuel cell, the methanol water solution 109 is hard to be discharged on the basis of the air pressure difference between the inner and outer sides of the casing 110, only by opening the fuel valve 131 and the closing valve 139, until the opening 173 of the air pressure balancing portion 170 is simultaneously opened. Therefore, even in the case that the nursling or the like erroneously touches, the methanol water solution 109 does not easily leak out. As mentioned above, it is possible to further improve the safety with respect to the fuel supply by improving the airtightness of the casing 110 and forming the air pressure balancing portion 170.

In this case, a rate at which the tank portion 120 occupies within the casing 110 is going to be reduced, on the basis of the fuel supply from the fuel tank 104 for the fuel cell. In the fourth embodiment, since the sealing performance within the casing 110 is improved, the air pressure balancing portion 170 is provided and the air is introduced into the casing 110, in order to compensate the volume reduction of the tank portion 120. However, the material compensating the volume reduction is not limited to the gas such as the air. In other words, as has been already described, the water is generated in the power generating portion 220 in accordance with the power generation. Accordingly, it is possible to utilize, for example, the water as the material compensating the volume reduction. From this point of view, the air pressure balancing portion 170 can be reworded as a volume reduction compensating mechanism within the casing 110.

Further, the following structure can be employed as an improved example of the fourth embodiment.

Figure 26:
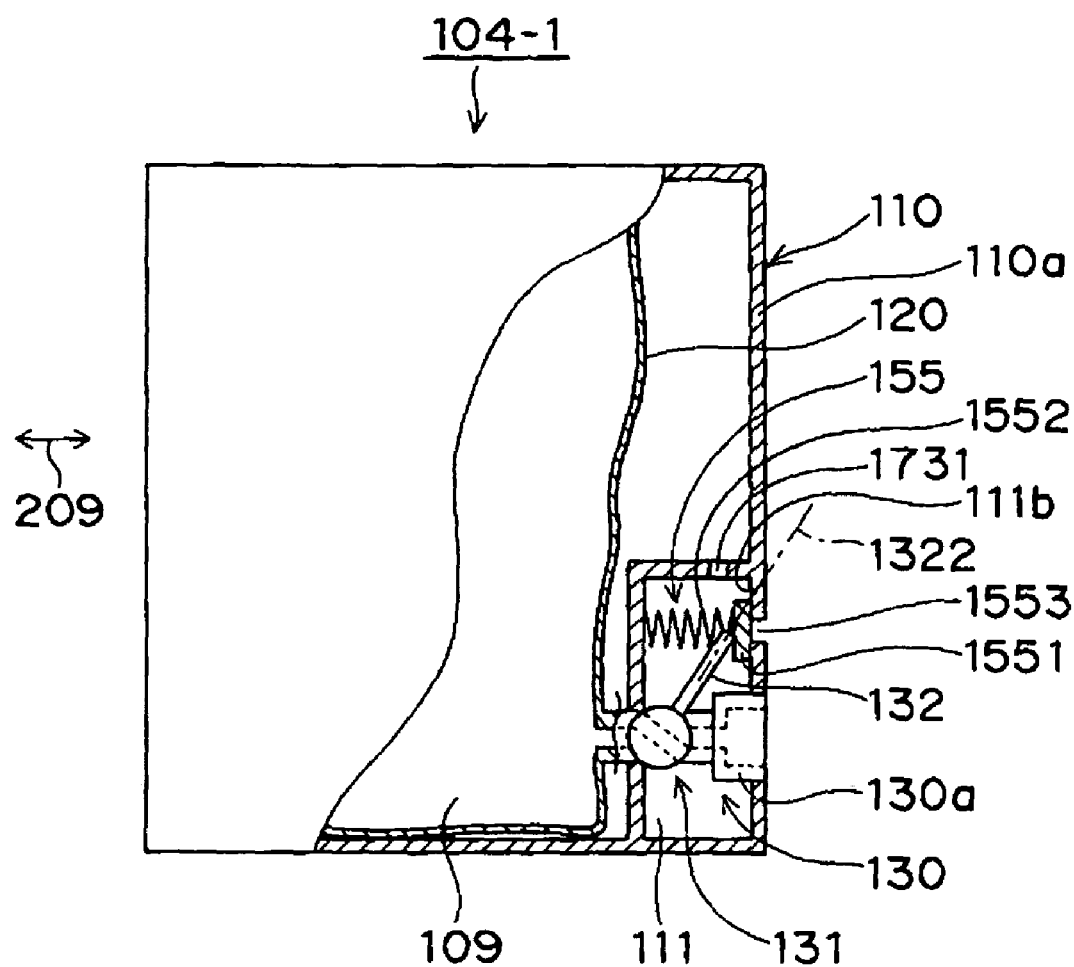
FIG. 26 is a view showing an improved example of the fuel tank for the fuel cell shown in FIG. 23.
Figure 27:
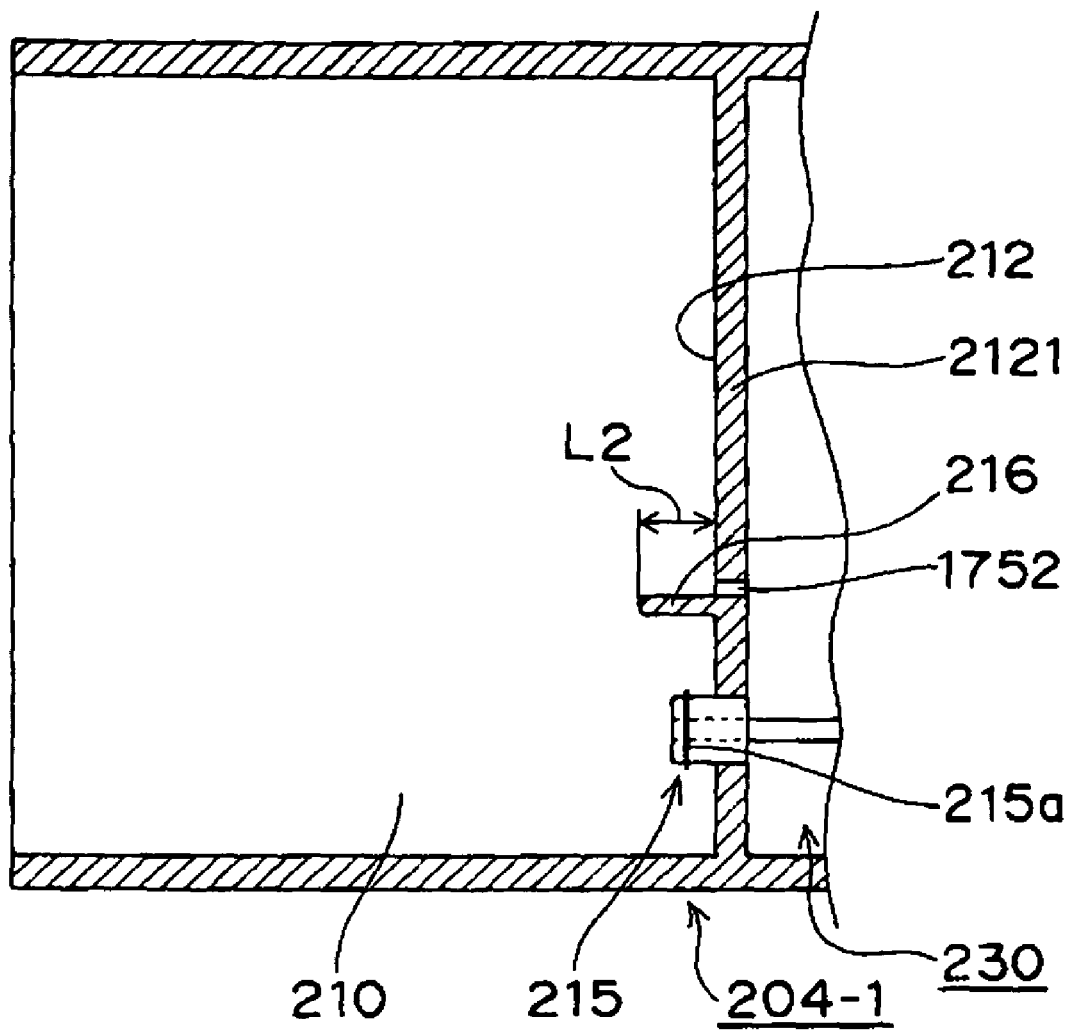
FIG. 27 is a view showing a fuel cell main body corresponding to the improved type fuel tank for the fuel cell shown in FIG. 26.

In other words, as a fuel tank 104-1 for a fuel cell shown in FIG. 26, the closure plate 171, the spring 172 and the opening 173 can be omitted by forming an opening 1731 for introducing an air in a part of the wall forming the concave portion 111. In this case, the opening 1731 corresponds to a structural example achieving the function of the air pressure balancing portion 170 mentioned above. Further, the handle operating member 1551 corresponds to a portion maintaining the airtight state within the casing 110 by forming the opening 1731 in the concave portion 111. Therefore, the handle operating member 1551 may be provided with a member for airtightness, for example, an O-ring or the like, or the handle operating member 1551 itself is made of an elastic material such as a rubber material or the like. Further, as a fuel cell main body 204-1 shown in FIG. 27, the push-down member 1751 can be omitted by arranging an air hole 1752 at a position which is in adjacent to the valve opening and closing member 216 and corresponds to the opening 1553.

Figure 28:
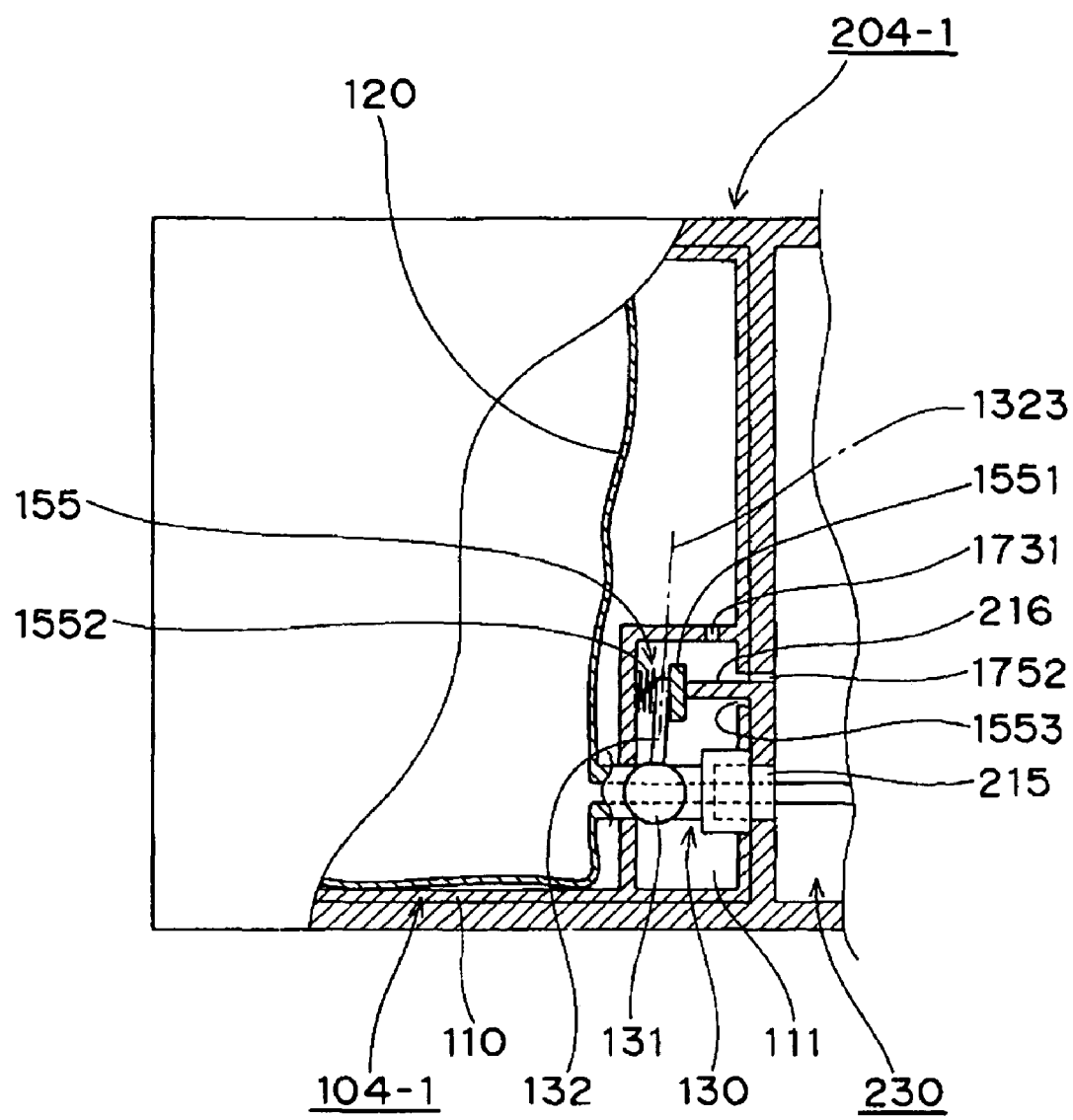
FIG. 28 is a view showing a state in which the fuel tank for the fuel cell shown in FIG. 26 and the fuel cell main body shown in FIG. 27 are joined.

In accordance with the improved example mentioned above, as shown in FIG. 28, when the fuel tank 104-1 for the fuel cell is completely loaded to the tank accommodating portion 210, it is possible to balance the air pressure within the casing 110 with the external portion through the opening 1731, the opening 1553 and the air hole 1752.

As mentioned above, in accordance with the structure of the improved example mentioned above, it is possible to intend to simplify the structure while holding the effect of the fourth embodiment.

Fifth Embodiment

Further, a description will be given of a fifth embodiment corresponding to a modified example of the fuel cell system 301 mentioned above.

Figure 29:
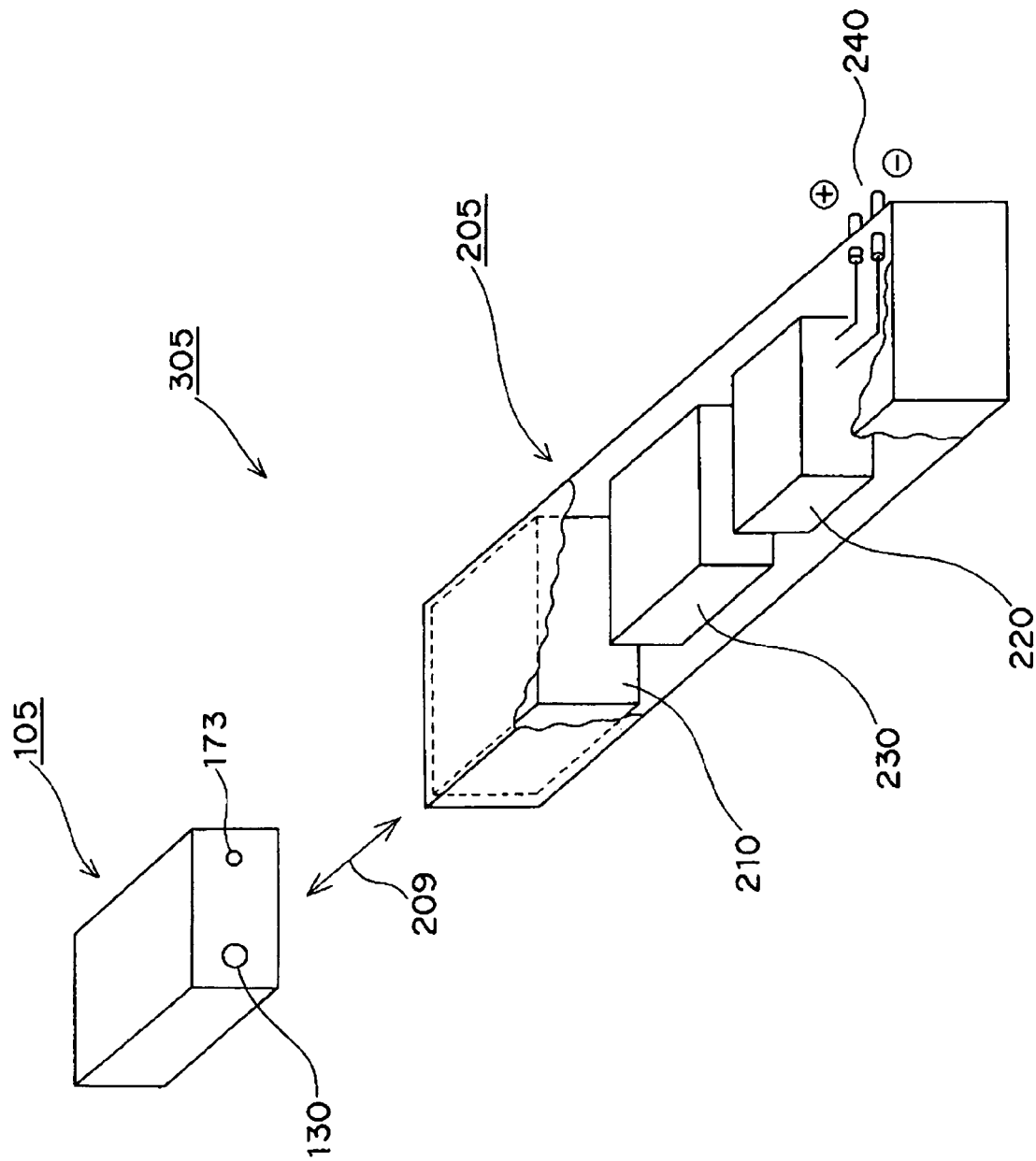
FIG. 29 is a perspective view showing a fuel cell system in accordance with a fifth embodiment of the present invention.

As shown in FIG. 29, a fuel cell system 305 corresponding to one of the fifth embodiment comprises a fuel tank 105 for a fuel cell corresponding to a modified example of the fuel tank 101 for the fuel cell mentioned above, and a fuel cell main body 205 corresponding to a modified example of the fuel cell main body 201 mentioned above. In the present fifth embodiment, as described below, since the passage of the methanol water solution 109 from the fuel tank 105 for the fuel cell to the fuel cell main body 205 is electrically controlled, a new lock mechanism 285 is provided in the fuel cell main body 205 in place of the lock mechanism 280. In this case, in order to avoid any confusion, the lock mechanism 285 is described as a second lock mechanism 285 in the following description of the present fifth embodiment.

Further, the same reference numerals are attached to the portions having the same or similar functions to the constituting portions in the fourth embodiment mentioned above, and a description thereof will not be repeated.

Figure 30:
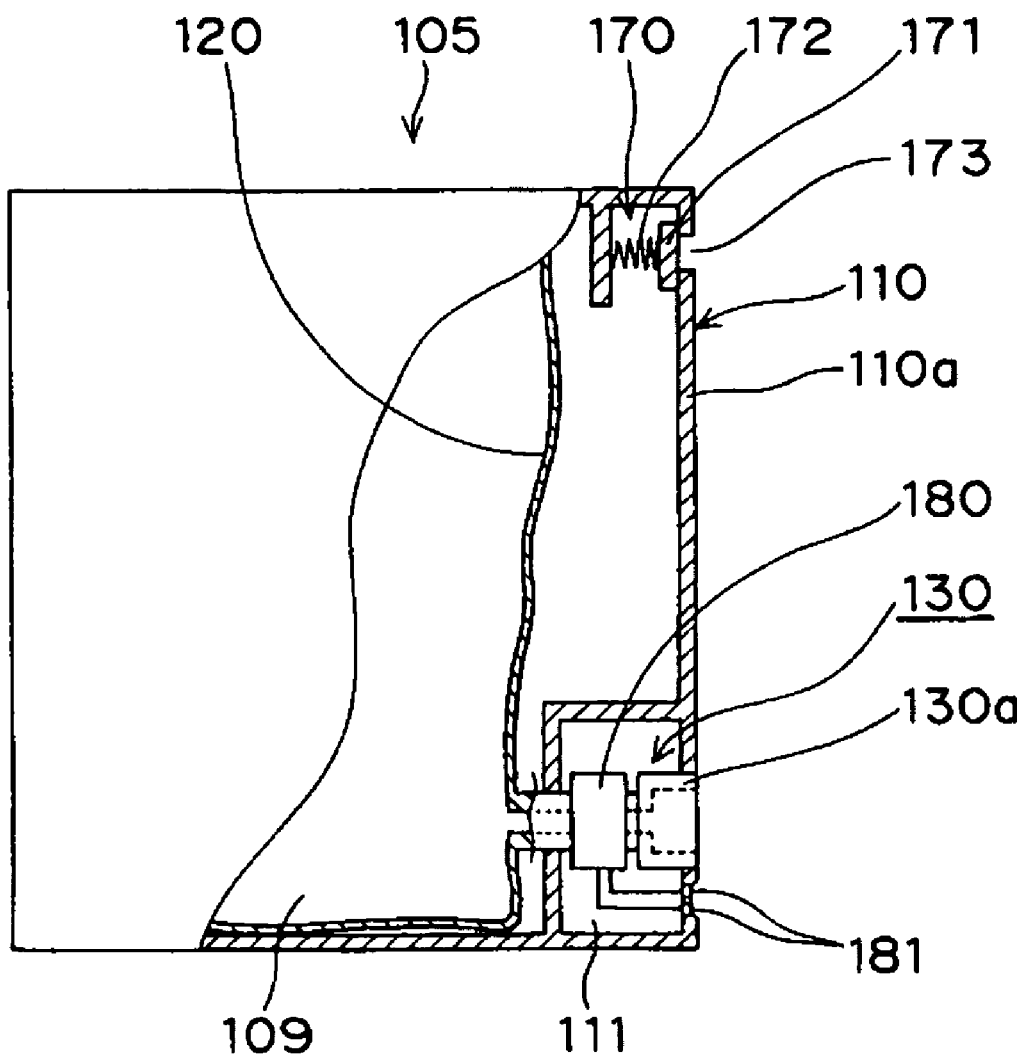
FIG. 30 is a view showing a structure of a fuel tank for a fuel cell provided in the fuel cell system shown in FIG. 29.

The fuel tank 105 for the fuel cell has a similar structure to the fuel tank 104 for the fuel cell mentioned above, as shown in FIG. 30. Accordingly, a description will be given below only of a different point from the fuel tank 104 for the fuel cell, and the description of the constituting portions having the same reference numerals will not be repeated. Further, the fuel tank 105 for the fuel cell is of a type of improving the airtightness within the casing 110 in the same manner as the fuel tank 104 for the fuel cell.

In the fuel injecting portion 130, the fuel tank 104 for the fuel cell employs the ball valve type fuel valve 131, however, the fuel tank 105 for the fuel cell employs an electromagnetic valve 180 electrically controlling the passage of the methanol water solution 109 and functioning as a flow path opening and closing member, and tank side connection terminals 181 connected to the electromagnetic valve 180 are exposed to the casing 110 in adjacent to the leading end portion 130a of the fuel injecting portion 130. Since the electromagnetic valve 180 is employed, the fuel tank 105 for the fuel cell is not provided with the second handle operating mechanism 155 of the fuel tank 104 for the fuel cell.

The electromagnetic valve 180 has a valve structure using a solenoid in this case, is opened after installing the fuel tank 105 for the fuel cell to the fuel cell main body 205 so as to allow the methanol water solution 109 to be supplied to the fuel cell main body 205 from the fuel tank 105 for the fuel cell, and is closed before disconnecting the fuel tank 105 for the fuel cell from the fuel cell main body 205 so as to shut off the supply of the methanol water solution 109.

Figure 31:
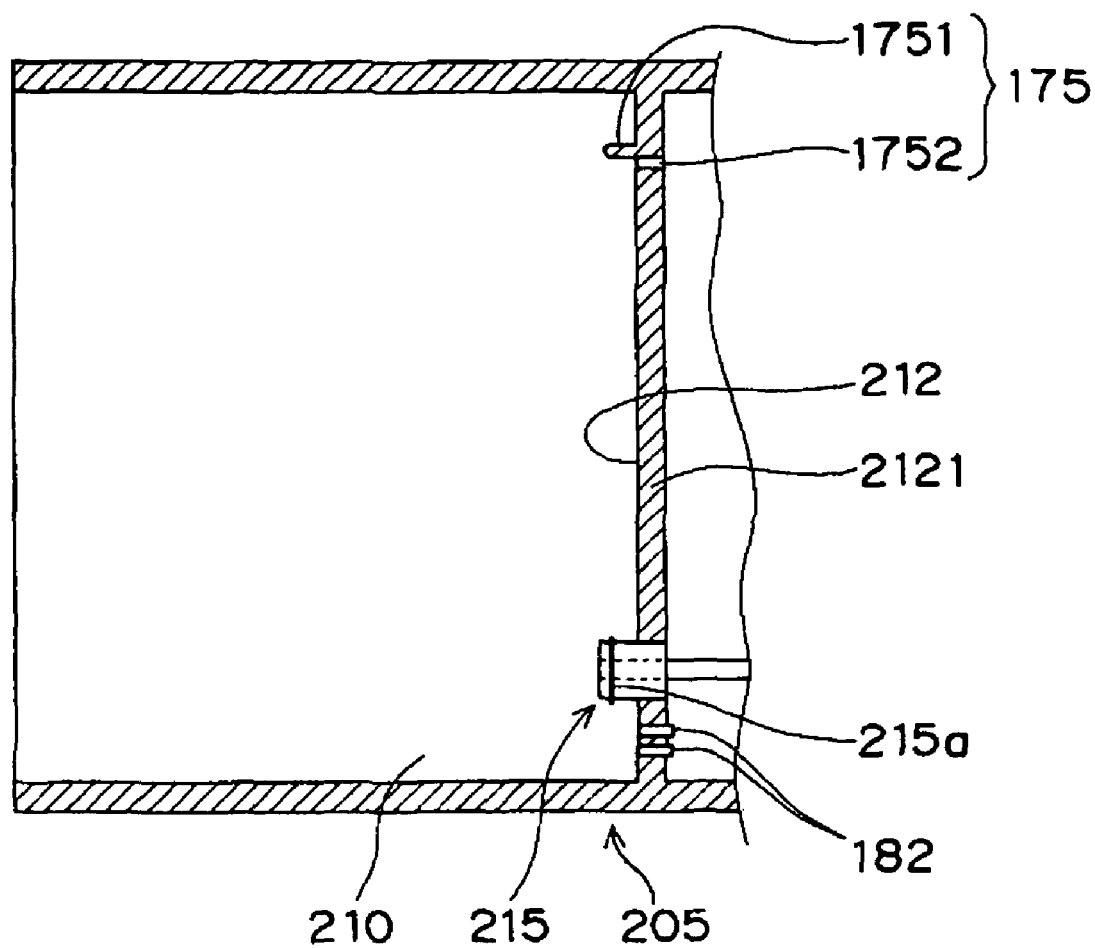
FIG. 31 is a view showing a structure of a fuel cell main body provided in the fuel cell system shown in FIG. 29.

Next, a description will be given of the fuel cell main body 205. As shown in FIG. 31, the fuel cell main body 205 has a similar structure to the fuel cell main body 204 mentioned above. Accordingly, a description will be given below only of different points from the fuel cell main body 204, and a description of the constituting portions having the same reference numerals will not be repeated here.

As mentioned above, since the fuel tank 105 for the fuel cell is not provided with the second handle operating mechanism 155, the valve opening and closing member 216 is not provided in the fuel cell main body 205 in comparison with the fuel cell main body 204. On the other hand, a partition wall 2121 is provided with main body side connection terminals 182 which are arranged in correspondence to the tank side connection terminals 181 provided in the fuel tank 105 for the fuel cell and can be electrically connected to the tank side connection terminals 181.

Figure 33:
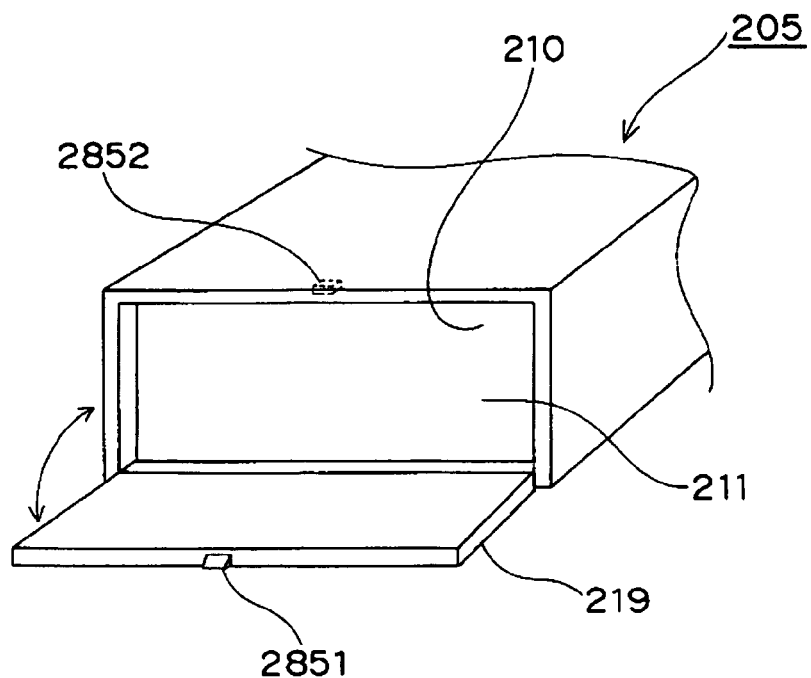
FIG. 33 is a perspective view showing a lock mechanism provided in the fuel cell system shown in FIG. 29.
Figure 34:
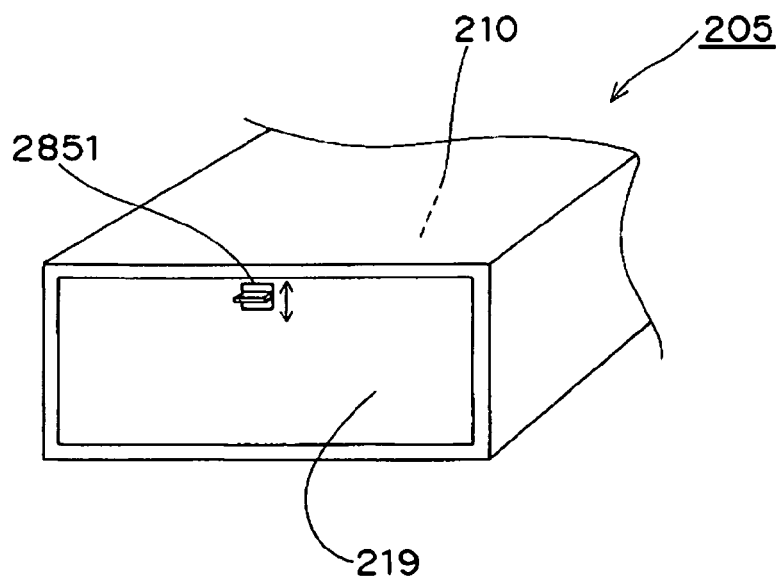
FIG. 34 is a perspective view showing the lock mechanism provided in the fuel cell system shown in FIG. 29.

Next, a description will be given of the second lock mechanism 285 with reference to FIGS. 33 and 34.

Figure 35:
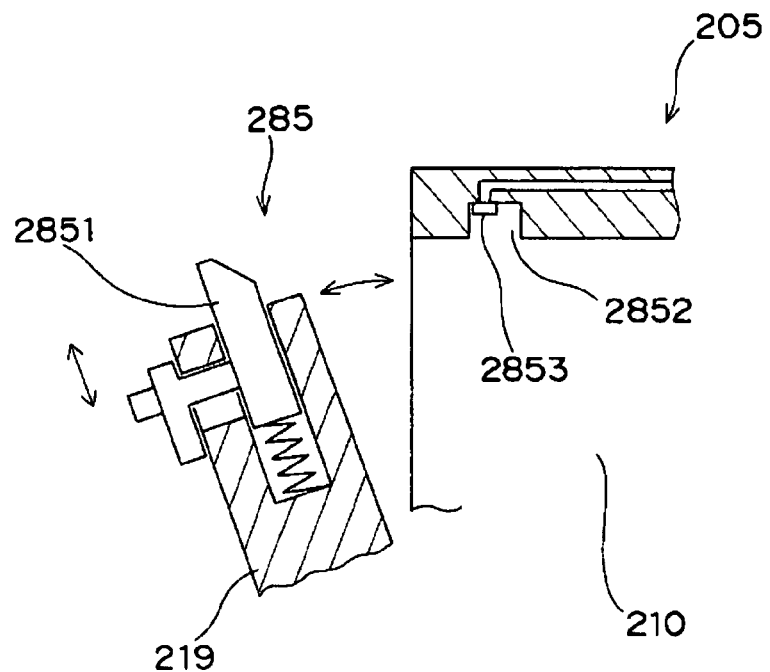
FIG. 35 is a cross sectional view showing a structure of the lock mechanism shown in FIGS. 33 and 34.

In the present embodiment, an opening and closing lid 219 closed after loading the fuel tank 105 for the fuel cell to the tank accommodating portion 210 is attached to an entrance of the fuel tank 105 for the fuel cell in the tank accommodating portion 210 of the fuel cell main body 205 by a hinge so as to be openable and closable. As shown in FIG. 35, the second lock mechanism 285 has an operating member 2851 which is provided in the opening and closing lid 219 and can be moved forward and backward in the opening and closing lid 219 while being energized by a spring, and a concave portion 2852 which is formed in the fuel cell main body 205 side, and is engaged with the operating member 2851 at a time when the tank accommodating portion 210 is closed by the opening and closing lid 219, thereby inhibiting the opening and closing lid 219 from carelessly opening. Further, the concave portion 2852 has a sensor 2853 corresponding to an example of a detecting portion which becomes in an ON state at a time when the operating member 2851 is engaged, and becomes in an OFF state at a time when the engagement state is cancelled. As the sensor 2853, it is possible to use various sensors, for example, an on-off switch executing a detection on the basis of a contact operation with the operating member 2851, an optical sensor executing a detection on the basis of a non-contact operation and the like. When opening the opening and closing lid 219, an operator pushes down the operating member 2851 so as to cancel the engagement with the concave portion 2852. Further, the structure of the second lock mechanism 285 is not limited to the structure mentioned above, but can employ any structure which can be easily derived by those skilled in the art as far as achieving the function of preventing the careless opening and closing.

Figure 36:
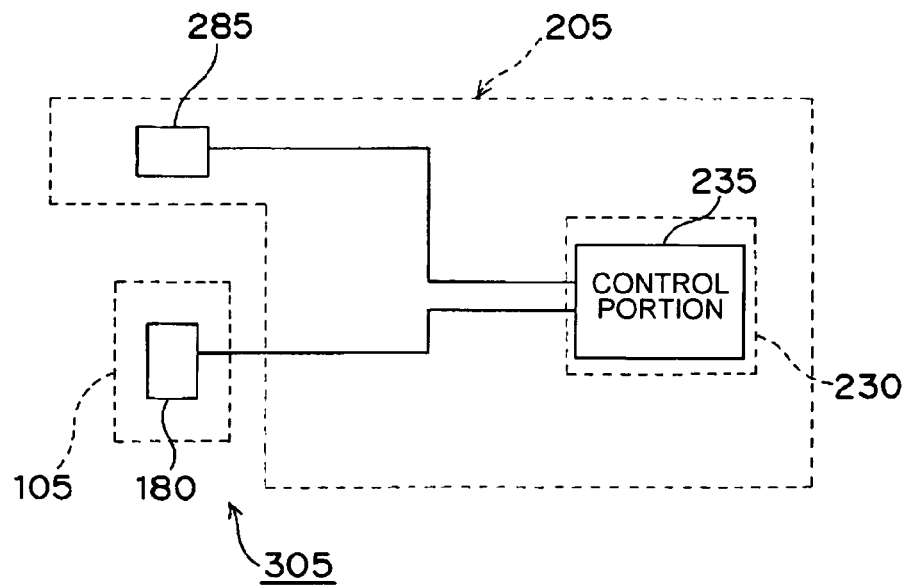
FIG. 36 is a block diagram showing a lock mechanism, an electromagnetic valve and a control portion provided in the fuel cell system shown in FIG. 29.

Further, since there is provided with the electronic valve 180 and the second lock mechanism 285 capable of electrically detecting the lock state as mentioned above, a control portion 235 is provided in the power generation auxiliary portion 230 of the fuel cell main body 205, in the present fifth embodiment. As shown in FIG. 36, the control portion 235 controls in such a manner that the electromagnetic valve 180 can be operated only in the case that the fuel tank 105 for the fuel cell is loaded to the tank accommodating portion 210, and the tank accommodating portion 210 is closed by the opening and closing lid 219 so as to be locked by the second lock mechanism 285. In this case, the control portion 235 has a power source for electrically controlling the operation of the electromagnetic valve 180 as mentioned below.

A description will be given of an operation of filling the fuel to the fuel cell main body 205 from the fuel tank 105 for the fuel cell in the fuel buttery system 305 structure as mentioned above. In this case, a description of the same operations as the fuel filling operation described in the embodiments mentioned above will not be repeated.

The fuel tank 105 for the fuel cell is oriented so as to be inserted to the tank accommodating portion 210 in such a manner that the fuel injecting portion 130 and the like in the fuel tank 105 for the fuel cell face to the bottom surface 212 of the tank accommodating portion 210 of the fuel cell main body 205. In accordance that the fuel tank 105 for the fuel cell moves forward within the tank accommodating portion 210, the fuel injecting portion 130 and the fuel supply portion 215 are engaged, and the closing valve 139 and the closing valve 2141 are brought into contact with each other so as to open the flow path. In this case, the electromagnetic valve 180 maintains the closed state yet at this time. Further, the push-down member 1751 pushes down the closure plate 171 through the opening 173, and opens the inner side of the casing 110 to the external portion.

Figure 32:
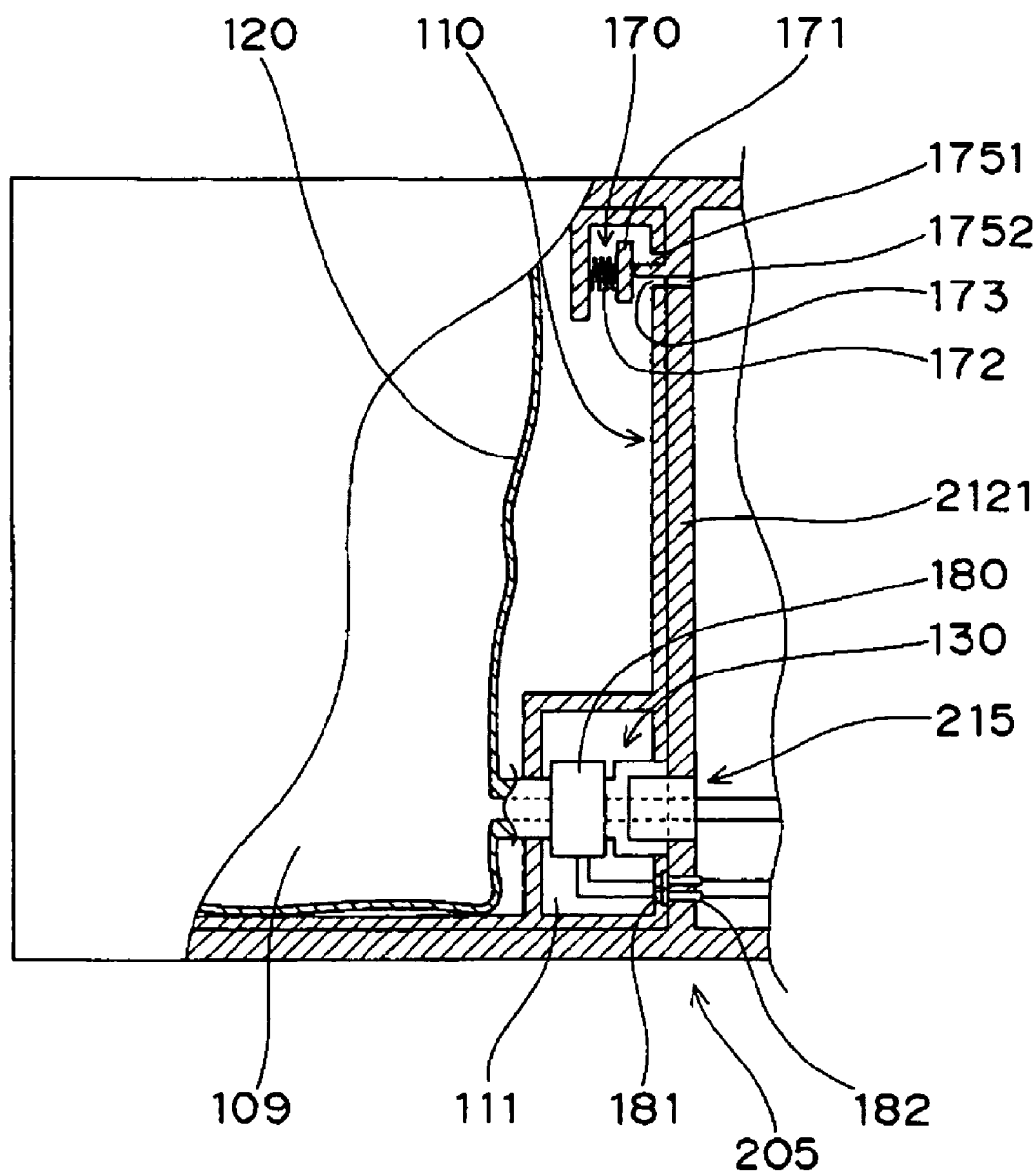
FIG. 32 is a view showing a state in which the fuel tank for the fuel cell shown in FIG. 30 and the fuel cell main body shown in FIG. 31 are joined.

After the fuel tank 105 for the fuel cell further moves forward, and the loading of the fuel tank 105 for the fuel cell to the tank accommodating portion 210 is finished, as shown in FIG. 32, the opening and closing lid 219 of the tank accommodating portion 210 is closed. On the basis of the closing operation, the operating member 2851 and the concave portion 2852 are engaged and the opening and closing lid 219 is locked. Further, the sensor 2853 is actuated on the basis of the lock operation, and a lock finish signal is transmitted to the control portion 235. The control portion 235 generates an electric signal to the electromagnetic valve 180 in such a manner as to open the valve in accordance with a receipt of the lock finish signal. Accordingly, the electromagnetic valve 180 opens the flow path. Therefore, the flow path between the fuel injecting portion 130 and the fuel supply portion 215 is completely opened, and the fuel can be supplied. Further, the push-down operation of the closure plate 171 by the push-down member 1751 is maintained.

The lock of the opening and closing lid 219 is disengaged after supplying the fuel. In other words, the operating member 2851 of the opening and closing lid 219 is operated by the operator, and the engagement between the operating member 2851 and the concave portion 2852 is canceled. Accordingly, it is possible to open the opening and closing lid 219, and an electric signal for canceling the lock is transmitted to the control portion 235 from the sensor 2853. Accordingly, the control portion 235 puts out an electric signal to the electromagnetic valve 180 so as to close the valve. Accordingly, the electromagnetic valve 180 closes the valve. Therefore, the flow path between the fuel injecting portion 130 and the fuel supply portion 215 is shut off. As mentioned above, after shutting off the flow path, the fuel tank 105 for the fuel cell is disconnected from the fuel cell main body 205.

When the disconnection, the closure plate 171 moves to the side wall 110a side on the basis of the energizing force of the spring 172 in correspondence to the retraction of the push-down member 1751, and the closure plate 171 is brought into contact with the side wall 110a. On the basis of the contact, the inner side of the casing 110 is sealed from the external portion. Thereafter, on the basis of the disconnection between the fuel injecting portion 130 and the fuel supply portion 214, the closing valves 139 and 2141 in both elements become in the closed state corresponding to the original state, as shown in FIGS. 10 and 11.

As described above, even in the fuel cell system 305, in addition to the effect achieved by each of the embodiments mentioned above, since the opening and closing of the flow path between the fuel injecting portion 130 and the fuel supply portion 215 is electrically controlled on the basis of the lock operation in the opening and closing lid 219 of the tank accommodating portion 210, the flow path is properly opened and closed at a time when the fuel cell main body 205 and the fuel tank 105 for the fuel cell are attached and detached. Therefore, the methanol water solution 109 of the liquid fuel does not leak out from the fuel tank 104 for the fuel cell at the attaching and detaching time mentioned above. Further, since the opening and closing of the flow path is electrically controlled, it is possible to reduce the case that the leakage of the methanol water solution 109 is generated by an artificial manipulation in comparison with each of the embodiments mentioned above, and it is possible to more improve the safety in the fuel supply.

In this case, each of the fuel cell systems 301 to 305 mentioned above is particularly exemplified by the shape of the inner surface of the tank accommodating portion 210 of the fuel cell main body and the outer surface of the fuel tank for the fuel cell brought into contact with the inner surface, in which the concavity and convexity is not provided, however, in order to clearly understand the positioning and the vertical inserting direction of the fuel tank for the fuel cell, it is possible to employ a structure such that rail-shaped concavity and convexity are combined.

Figure 37:
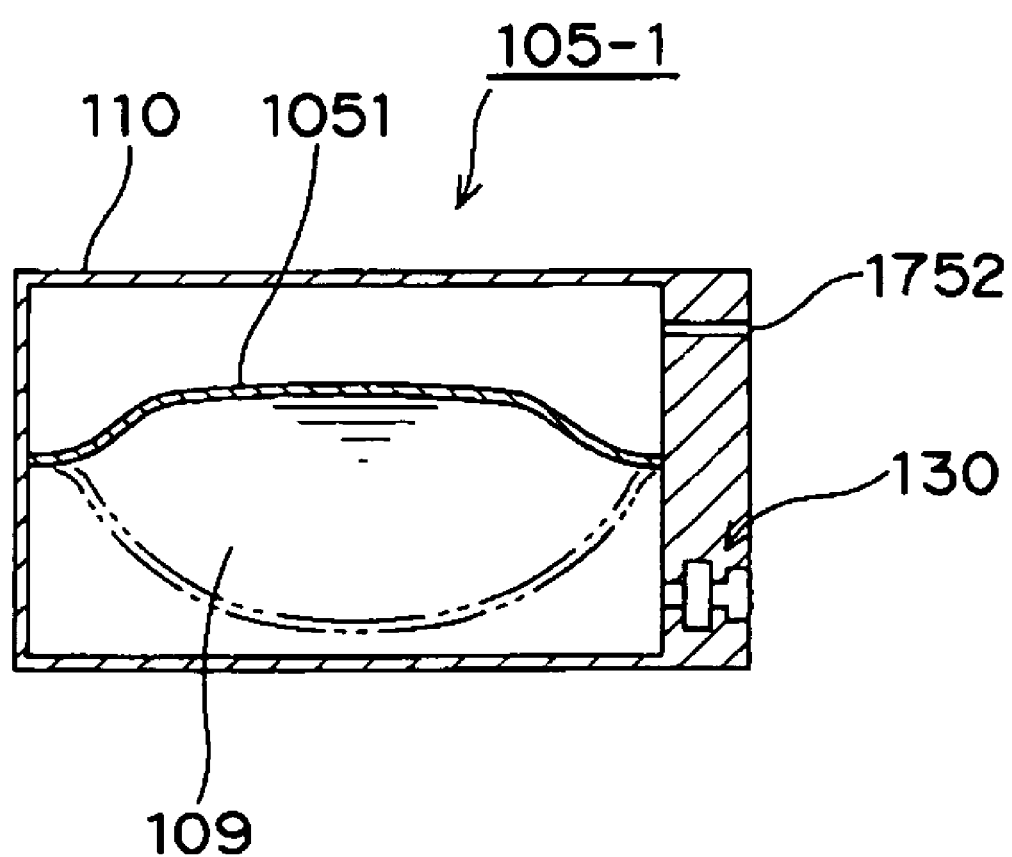
FIG. 37 is a cross sectional view showing a modified example of the fuel tank for the fuel cell in each of the embodiments.

The tank portion 120 included in each of the fuel cell systems 301 to 305 is formed in a bag shape, the methanol water solution 109 is sealed in an inner portion thereof in a state in which no gas is contained, and the tank portion 120 itself is deformed in accordance with the reduction of the methanol water solution 109. On the basis of the structure mentioned above, it is possible to always arrange the methanol water solution 109 at the fuel injecting portion 130 regardless of the attitude of the fuel cell systems 301 to 305, and it is possible to contribute to a stable supply of the methanol water solution 109. However, as far as satisfying a condition that the methanol water solution 109 is always arranged at the fuel injecting portion 130 regardless of the attitude of the fuel cell systems 301 to 305, the structure of the tank portion 120 is not limited to the bag shape as mentioned above, but can employ various structures which can be easily derived by those skilled in the art. For example, it is possible to employ a fuel tank 105-1 for a fuel cell as shown in FIG. 37. In this case, FIG. 37 shows the structure employing the fuel tank 105 for the fuel cell as one example, and the same structure can be employed in the fuel tanks 101 to 104 for the fuel cell mentioned above. In the fuel tank 105-1 for the fuel cell, within the casing 110, there is provided a sealing member 1051 made of a material having a flexibility, for example, a polypropylene, a polyethylene or the like, and sealing the methanol water solution 109 without including the gas. The sealing member 1051 can be deformed as illustrated by a virtual line in accordance with the reduction of the methanol water solution 109.

Further, in the fuel cell systems 301 to 305, the fuel supply is performed by sucking the methanol water solution 109 within the fuel tank for the fuel cell by the fuel pump 232 included in the power generation auxiliary portion 230, however, in the fuel tank 105-1 for the fuel cell, it is possible to extrude the sealed methanol water solution 109 by further making the sealing member 1051 by the material having the flexibility, and it is possible to omit the fuel pump 232. In this case, the fuel pump 232 can be omitted by making the tank portion 120 in each of the fuel tanks 101 to 105 for the fuel cell by the material having the flexibility.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

The present invention is applicable for a fuel tank for a fuel cell which can be connected to a fuel cell generating an electric power by directly supplying an organic fuel such as a methanol or the like to an anode electrode, and a fuel cell system including the fuel tank for the fuel cell.

The invention claimed is:

1. A fuel tank for a fuel cell, the fuel tank accommodating a liquid fuel supplied to a fuel cell main body and being detachable with respect to said fuel cell main body, the fuel tank comprising:
a tank container configured to accommodate the liquid fuel;
a fuel injecting portion coupled to the tank container and configured to be engaged with a fuel supply portion included in said fuel cell main body, thereby providing a flow path for the liquid fuel between the tank container and the fuel cell main body; and
a flow path opening and closing member including a fuel valve and a closing valve, the fuel valve being provided in the fuel injection portion and the closing valve being provided in the fuel injection portion, the fuel valve being located between the tank container and the closing valve along the flow path for the liquid fuel, wherein:
the closing valve is configured to engage with the fuel supply portion and to open before the fuel valve opens when the fuel injecting portion and the fuel supply portion are being connected, and
the closing valve is configured to close after the fuel valve closes when the fuel injecting portion and the fuel supply portion are being disconnected.

2. The fuel tank for the fuel cell according to claim 1, wherein said fuel valve has a handle configured to open and close a liquid fuel flow path in said fuel valve by a valve opening and closing member provided in said fuel cell main body, in accordance with an attachment and detachment between said fuel cell main body and said fuel tank.

3. The fuel tank for the fuel cell according to claim 2, further comprising:
a handle operating mechanism provided in said fuel tank at a position capable of operating said handle, wherein said handle operating mechanism has a handle operating member configured to be operated by said valve opening and closing member in accordance with the attachment and detachment between said fuel cell main body and said fuel tank, bring into contact with said handle, and open and close said liquid fuel flow path; and
an improper operation preventing member configured to allow said handle operating member to move only at a time of connecting the fuel tank complying with said fuel cell main body to said fuel cell main body.

4. The fuel tank for the fuel cell according to claim 2, wherein said fuel valve has a member for rotation corresponding to said handle and engaging with said valve opening and closing member; and an engaging portion configured to rotate said valve opening and closing member engaging with said member for rotation in accordance with the attachment and detachment between said fuel cell main body and said fuel tank.

5. The fuel tank for the fuel cell according to claim 1, further comprising a casing provided with a concave portion accommodating said fuel injecting portion and said flow path opening and closing member,
wherein said casing has a shutter configured to be provided in an opening portion of said concave portion and open and close said concave portion at a time of attaching and detaching said fuel cell main body and said fuel tank.

6. The fuel tank for the fuel cell according to claim 1, wherein the tank container is made of a material which is deformable in accordance with a reduction of the contents, the fuel tank further comprising:
a casing configured to accommodate said tank container in an inner portion so as to maintain said inner portion in an airtight state; and
an air pressure balancing portion configured to be provided in said casing and balance an air pressure between inner and outer sides of said casing.

7. The fuel tank for the fuel cell according to claim 1, wherein said fuel valve is constituted by an electromagnetic valve which opens and closes the flow path on a basis of an electric signal.

8. A fuel cell system comprising:
a fuel tank for a fuel cell, the fuel tank accommodating a liquid fuel, wherein said fuel tank comprises:
a tank container configured to accommodate the liquid fuel,
a fuel injecting portion coupled to the tank container and configured to be engaged with a fuel supply portion included in said fuel cell, thereby providing a flow path for the liquid fuel between the tank container and the fuel cell, and a flow path opening and closing member including a fuel valve and an injecting portion side closing valve, the fuel valve being provided in the fuel injection portion and the injecting portion side closing valve being provided in the fuel injection portion, the fuel valve being located between the tank container and the injecting portion side closing valve along the flow path for the liquid fuel, wherein:

the injecting portion side closing valve is configured to engage with the fuel supply portion and to open before the fuel valve opens when the fuel injecting portion and the fuel supply portion are being connected, and the injecting portion side closing valve is configured to close after the fuel valve closes when the fuel injecting portion and the fuel supply portion are being disconnected; and a fuel cell main body configured to be detachable with respect to said fuel tank and configured to include the fuel supply portion engaging with said fuel injecting portion of said fuel tank said fuel supply portion provided in said fuel cell main body has a supply portion side closing valve which is brought into contact with said injecting portion side closing valve so as to open and close the flow path.

9. The fuel cell system according to claim 8, wherein said fuel cell main body further has a valve opening and closing member configured to act on a handle opening and closing a liquid fuel flow path of the fuel valve in accordance with an attachment and detachment between said fuel cell main body and said fuel tank for the fuel cell, wherein said valve opening and closing member is constituted by a rod-shaped member having such a length as to open said liquid fuel flow path with respect to said handle after said fuel injecting portion and said fuel supply portion are joined, and close said liquid fuel flow path with respect to said handle before said fuel injecting portion and said fuel supply portion are disconnected.

10. The fuel cell system according to claim 8, wherein the fuel valve has a member for rotation configured to correspond to a handle in which the liquid fuel flow path of said fuel valve is opened and closed by an opening and closing mechanism provided in said fuel supply portion in said fuel cell main body and configured to engage with said opening and closing mechanism, and an engagement portion configured to move said opening and closing mechanism engaging with said member for rotation in accordance with the attachment and detachment between said fuel cell main body and said fuel tank for the fuel cell, and wherein said opening and closing mechanism has a ring member which is rotatable with respect to said fuel supply portion; a connection member configured to be provided in said ring member, be engaged with said engagement portion at a time when said fuel supply portion and said fuel injecting portion are joined, and rotate said ring member in accordance with the attachment and detachment between said fuel cell main body and said fuel tank for the fuel cell; and a valve rotating member configured to be provided in said ring member, be engaged with said member for rotation after said connection member and said engagement portion are engaged, and move said member for rotation in accordance with a rotation of said ring member so as to open and close said fuel valve.

11. The fuel cell system according to claim 8, further comprising a lock mechanism configured to lock said tank for the fuel cell to said fuel cell main body at a time when said tank for the fuel cell is installed to said fuel cell main body in a state in which said liquid fuel can be supplied to said fuel cell main body from said tank for the fuel cell.

12. The fuel cell system according to claim 8, wherein said tank container is made of a material deformable in accordance with a reduction of the contents, said tank further comprises a casing configured to accommodate said tank container in an inner portion and maintain said inner portion in an airtight state; and an air pressure balancing portion configured to be provided in said casing and balance an air pressure between inner and outer sides of said casing, and wherein said fuel cell main body further comprises an engagement mechanism configured to be engaged with said air pressure balancing portion and balance the air pressure between the inner and outer sides of said casing at a time when said tank for the fuel cell is installed to said fuel cell main body.

13. The fuel cell system according to claim 8, wherein said flow path opening and closing member included in said fuel tank for the fuel cell is constituted by an electromagnetic valve for opening and closing the flow path on the basis of an electric signal, and wherein said fuel cell main body further comprises a lock mechanism configured to detect a matter that said tank for the fuel cell is installed to said fuel cell main body in a state in which said liquid fuel can be supplied to said fuel cell main body from said tank for the fuel cell, and a control portion configured to open and close said electromagnetic valve in response to a result of detection by said lock mechanism.

\* \* \* \* \*